(12) United States Patent
Torgerson et al.

(10) Patent No.: US 10,417,355 B1
(45) Date of Patent: Sep. 17, 2019

(54) SYSTEMS AND METHODS FOR CONSTRUCTING AND MODIFYING COMPUTER MODELS

(71) Applicant: The MathWorks, Inc., Natick, MA (US)

(72) Inventors: Jay R. Torgerson, Hopkinton, MA (US); Dennis J. Wilkinson, East Freetown, MA (US)

(73) Assignee: The MathWorks, Inc., Natick, MA (US)

( * ) Notice: Subject to any disclaimer, the term of this patent is extended or adjusted under 35 U.S.C. 154(b) by 730 days.

(21) Appl. No.: 14/657,635

(22) Filed: Mar. 13, 2015

(51) Int. Cl.
G06F 17/50 (2006.01)
G06G 7/62 (2006.01)
G06F 3/0484 (2013.01)
G06F 3/0482 (2013.01)

(52) U.S. Cl.
CPC ........ *G06F 17/5009* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | |
|---|---|---|
| 6,216,138 B1 | 4/2001 | Wells et al. |
| 8,862,446 B1 | 10/2014 | Balasubramanian |
| 8,904,302 B2 | 12/2014 | Higgins et al. |
| 2004/0210831 A1* | 10/2004 | Feng .................. G06F 17/5009 715/211 |
| 2006/0064294 A1* | 3/2006 | Clark .................. G06F 17/5009 703/22 |
| 2012/0084695 A1* | 4/2012 | Higgins .................. G06F 8/33 715/771 |
| 2013/0145312 A1 | 6/2013 | Dove et al. |

OTHER PUBLICATIONS

National Instruments "LabVIEW User Manual", Apr. 2003, pp. 1-1, 1-2, 5-11 through 5-20.*
"LabVIEW™ User Manual," National Instruments Corporation, Apr. 2003, pp. 1-349.
"MagicDraw User Manual," Version 17.0.1, No Magic, Inc., Dec. 2011, pp. 1-936.
"MagicDraw User Manual ," Vesion 18.1, No Magic, Inc., Jan. 2015, pp. 1-1170.
Ramirez et al., ArgoUML User Manual, 2004, 403 pages.

* cited by examiner

*Primary Examiner* — Cedric Johnson
(74) *Attorney, Agent, or Firm* — Cesari and McKenna, LLP; Michael R. Reinemann

(57) ABSTRACT

A system and method predicts one or more next steps during the construction or editing of a graphical model having executable semantics. The one or more next steps being valid actions according to the executable semantics and/or syntax of the graphical model. The system and method presents ghost versions of the one or more next steps on a display of the graphical model. In response to user selection of a given ghost version, the system and method changes the selected ghost version into a completed action at the graphical model. The system and system may also update an in-memory representation of the graphical model with the completed action. The in-memory representation supporting execution of the graphical model.

23 Claims, 26 Drawing Sheets

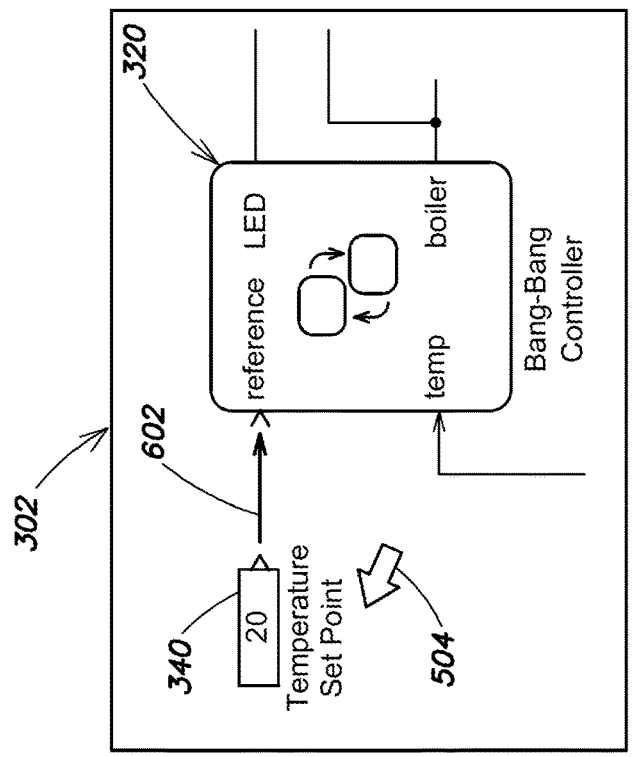
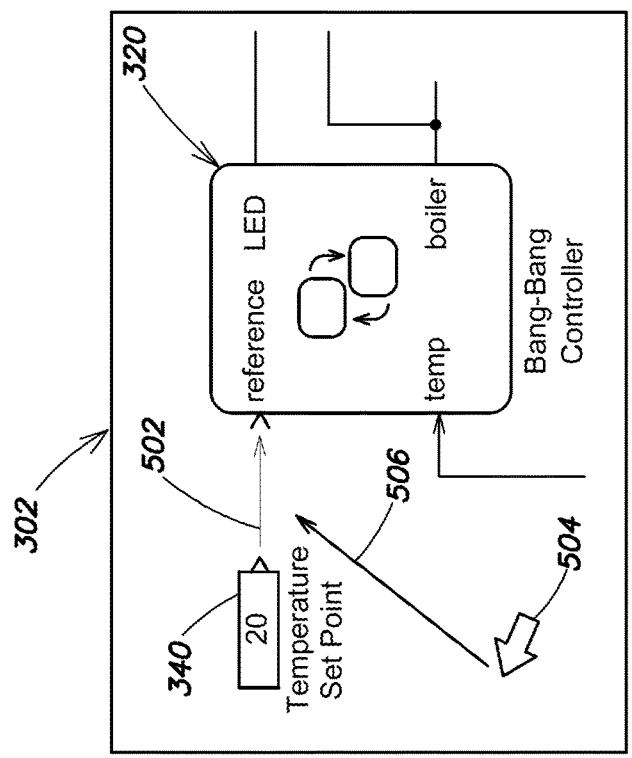

3102 — An Integrator Limited block is identified to an integrator block with the exception that the output of the block is limited based on upper and lower saturation limits.
When the output reaches the limits, the integral action is turned off to prevent integral windup.
The block determines output as follows:
When the integral is less than or equal to the Lower saturation limit, the output is held at the Lower saturation limit.
When the integral is between the Lower saturation limit and the Upper saturation limit, the output is the integral.
When the integral is greater than or equal to the Upper saturation limit, the output is held at the Upper saturation limit.

*FIG. 31*

3002 — An integral block outputs the value of the integral of its input signal with respect to time.
An integrator block may be treated as a dynamic system with one state. Its dynamic may be given by:
$x(t) = u(t)$
$y(t) = x(t)$
$x(t_0) = x_0$
where:
u is the block input.
y is the block output.
x is the block state.
$x_0$ is the initial condition of x.
While these equations may define an exact relationship in continuous time, numerical approximation methods may be used to evaluate them with finite precision. Different numerical integration methods may be used to compute an integrator block's output, each with advantages in particular applications. To select the technique best suited to your application, use the Solver pane of the Configuration Parameters dialog.

*FIG. 30*

SYSTEMS AND METHODS FOR CONSTRUCTING AND MODIFYING COMPUTER MODELS

BRIEF DESCRIPTION OF THE DRAWINGS

The description below refers to the accompanying drawings, of which:

FIG. 5 is a schematic illustration of a portion of the model of FIG. 3 in accordance with an embodiment;

FIG. 6 is a schematic illustration of a portion of the model of FIG. 3 in accordance with an embodiment;

FIG. 30 is a schematic illustration of a presentation of contextual information in accordance with an embodiment; and FIG. 31 is a schematic illustration of a presentation of contextual information in accordance with an embodiment.

DETAILED DESCRIPTION OF ILLUSTRATIVE EMBODIMENTS

Figure 1:
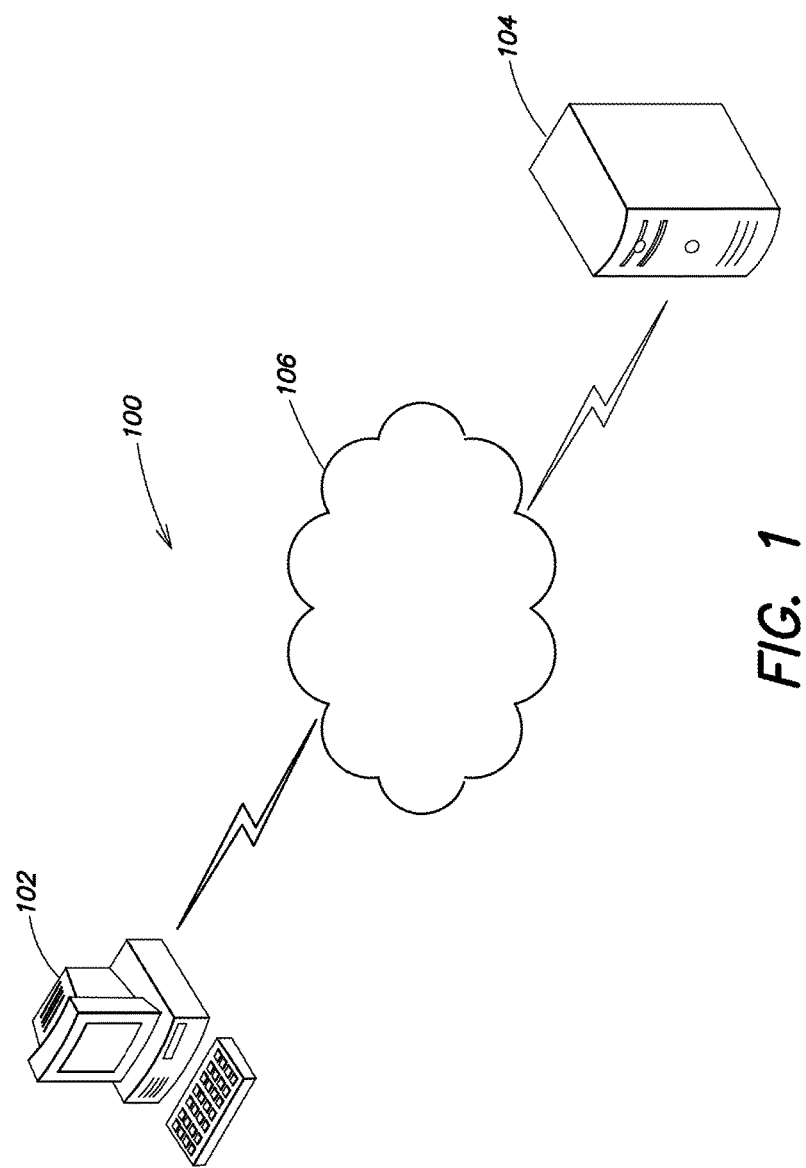
FIG. 1 is a schematic diagram of computer network in accordance with an embodiment.

Engineers, developers, and other users often utilize computer-based modeling environments to design systems. A user may construct a model of a system being designed within a modeling environment. The model may be a block diagram having interconnected blocks, icons, etc., and executable semantics. The blocks may operate according to time-based, state-based, event based, or a physical modeling domain. Relationships among the blocks may be established by visually connecting the blocks, for example with wires, line segments, arrows, or other connectors. Alternatively, relationships may be specified textually. During execution, a model may receive input data, the blocks may process that data, and the model may generate output values.

The modeling environment may include one or more libraries containing predefined block types configured to perform various functions or operations. The user may select desired block types from the libraries, and the modeling environment may add instances of the selected block types into a model being constructed or modified. The modeling environment may provide a user interface having a model canvas on which the model is presented. The libraries may include block types corresponding to the different modeling domains, and the modeling environment may support the construction of multi-domain models.

To simplify the appearance of a model and make its structure easy to understand, portions of the model may be placed at different hierarchical levels. With model hierarchy, blocks may be grouped together and replaced within virtual blocks, examples of which include subsystems, sub-models, subcharts, etc. A virtual block can be placed at a higher hierarchical level than those blocks grouped within the virtual block. The term model element broadly refers to blocks, connections, state charts, states, subsystems, subcharts, and sub-models.

A user may execute, e.g., run, a model using sample input data, and evaluate whether the model operates in the intended manner. For example, the user may determine whether the model, when executed, generates expected output values. When the user is satisfied that the model accurately represents the operation of a system being designed, a code generation tool may generate code, such as computer source code, for the model. The code generation tool may be part of the modeling environment or it may be a separate, add-on tool. The generated code, which may be run outside of the modeling environment, may be loaded onto a target hardware platform and run.

As the system being modeled becomes more complex, the model may include a large numbers of blocks. It is not uncommon for some models to have hundreds or thousands of or even more blocks. Constructing and modifying such large, multi-domain models can be time-consuming.

Overview

Briefly, exemplary embodiments can include systems and methods for facilitating constructing and modifying models, such as executable block diagram models. A modeling environment may include a modeling engine, a prediction engine, and a suggestion engine. The modeling engine may provide a model canvas on a User Interface through which a user may construct and modify a model. When a new block is added to a model, the prediction engine may analyze the model, and identify potential connections between the new block and one or more existing blocks of the model. For example, the prediction engine may determine whether a semantically and syntactically valid connection may be established between the new block and one or more existing blocks. The prediction engine may identify potential target blocks to which the new block may be connected based on one or more geometric criteria, such as block alignment, port alignment, distance, or spacing between blocks/ports, etc. In some embodiments, the prediction engine may use topological information to identify potential target blocks where topological information may include a degree of connectivity between respective blocks or other model elements. To determine whether a valid connection can be made, the prediction engine may analyze one or more attributes of the inputs or outputs of the new block, and one or more attributes of the inputs or outputs of a potential target block. Exemplary attributes include data types, data dimensions, complexity, modeling domain, block/port behavior, sample times, etc.

The suggestion engine may receive possible valid connections identified by the prediction engine. The suggestion engine may cause one or more graphical affordances to be presented on the model canvas where graphical affordances represent the possible valid connections to or from the new block. For example, the suggestion engine may present the graphical affordances directly, or it may direct another module, such as a user interface engine, to present the graphical affordances. The graphical affordances for the possible valid connections may differ from the graphical affordances that represent completed block connections. The possible valid connectives may differ visually, e.g., in display format. For example, the graphical affordances for a possible valid connection may be ghosted, e.g., faded or semi-transparent, versions of completed block connections. The user may examine these ghost connections as presented on the model canvas, and may select one or more of them. In response to the user's selection, the suggestion engine can convert the selected ghost connection into a completed block connection, e.g., by changing the display format of the selected ghost connection. The suggestion engine also may remove the other ghost connections, which were not selected, from the display.

In addition to presenting ghost connections, the suggestion engine may generate and present contextual information for one or more ghost connections. The contextual information may be presented in a graphical affordance, such as a pop up window on the model canvas. The contextual information may include information on the behavior or effect that would be achieved within the model if the respective ghost connection were selected to be converted into a completed connection by the user. The suggestion engine may present the contextual information in response to user input, such as a mouse hover operation over a particular ghost connection.

The prediction engine may analyze model elements at a different hierarchical level than a newly added block. For example, the prediction engine may determine that a valid connection is possible between the newly added block and one or more of the blocks grouped within a subsystem or sub-model. The suggestion engine may present a ghosted version of this potential connection, which may be selected by the user.

In some embodiments, the prediction engine determines whether a newly added block and/or an existing block requires a new port in order to establish a valid connection between the newly added block and the existing block. Some block types supported by the modeling environment can allow additional input or output ports to be added to the corresponding blocks. Examples of such block types include bus type blocks. The prediction engine may detect the existence of such blocks, and determine whether a valid connection with the newly added block is possible if a new port is added. The suggestion engine may receive an indication from the prediction engine that a possible connection can be made if a new port is added. The suggestion engine may cause one or more graphical affordances to be presented representing the new port. For example, the suggestion engine may present the graphical affordances directly, or it may direct another module, such as a user interface engine, to present the graphical affordances. The one or more graphical affordances for the new port may differ from the graphical affordances representing fixed ports of the block. For example, the graphical affordances for the new port may be ghosted, e.g., faded or semi-transparent, versions of the block's fixed ports. If a user selects a ghost connection coupled to a ghost port, the ghost port may be fixed to the existing or newly added block. That is, the ghost port may be converted to a fixed port, by changing the display format of the ghost port.

In some embodiments, a user may move a ghost port from a first location at the block to a second location. The first location may be a default location that is programmatically determined.

FIG. 1 is a schematic diagram of a computer network 100 having a client data processing device 102, a server data processing device 104, and a network 106. The client and server data processing devices 102 and 104 are interconnected through the network 106. The network 106 may include one or more interconnected data networks such as a Local Area Network (LAN), a Wide Area Network (WAN), a Metropolitan Area Network (MAN), the Internet, a Virtual Private Network (VPN), a wireless network, a cellular telephone network, the public switched telephone network (PSTN), etc. The server 104 may provide services to the client 102. It should be understood that other, possibly far more complex, network designs and/or client-server architectures may be implemented.

Figure 2:
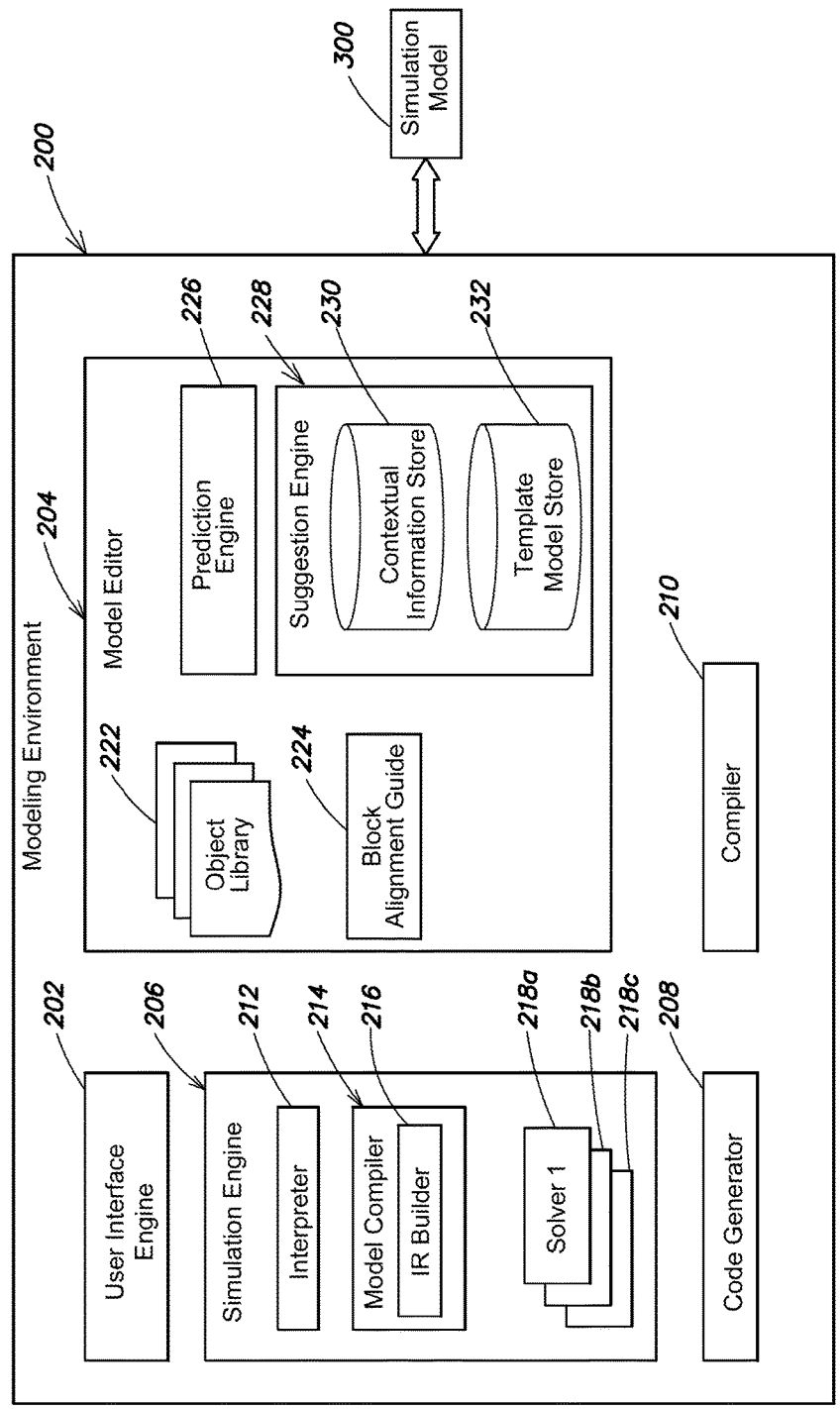
FIG. 2 is a schematic diagram of an example of a modeling environment in accordance with an embodiment.

FIG. 2 is a schematic diagram of a modeling environment 200 in accordance with an embodiment. The modeling environment 200 may be run on the client data processing device 102, the server data processing device 104, or its functionality may be distributed between them. For example, the modeling environment 200 may be run on the server 104 and its functionality provided to the client as a web-service. The modeling environment 200 includes a User Interface (UI) engine 202, a model editor 204, a simulation engine 206, a code generator 208, and a compiler 210. The UI engine 202 may create and present one or more User Interfaces (UIs), such as Graphical User Interfaces (GUIs) and/or Command Line Interfaces (CLIs), on a display of a workstation or other data processing device. The GUIs and CLIs may provide a user interface to the modeling environment 200, and may be operated by users to initiate various model-related tasks, such as opening, constructing, and saving models, such as a simulation model 300. The simulation engine 206 may include an interpreter 212, a model compiler 214, and one or more solvers, such as solvers 218a-c. The model compiler 214 may include one or more Intermediate Representation (IR) builders, such as IR builder 216.

The simulation engine 206 may execute, e.g., compile and run or interpret, computer-generated models, such as the model 300, using one or more of the solvers 218a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair, among others.

The model editor 204 may include model element type libraries 222, which may contain a plurality of pre-built model element types that may be used to construct or modify the model 300. The model editor 204 also may include a block alignment guide 224, a prediction engine 226, and a suggestion engine 228. The suggestion engine 228 may have access to a first storage unit 230 for storing contextual information, and a second storage unit 232 for storing modeling templates. The contextual information and the modeling templates may be in the form of one or more databases or other data structures. The suggestion engine 228 may access the information in the first and second storage units 230 and 232 for presentation to a user. The model editor 204 may perform selected operations, such as open, create, edit, and save, in response to user inputs. The block alignment guide 224, prediction engine 226, and suggestion engine 228 may anticipate possible future changes, edits, or modifications to the model 300, and may present information relating to the possible changes to a user for evaluation and selection.

The code generator 208 may generate code for a model automatically, such as source or object code. The generated code may be in a form suitable for execution outside of the modeling environment 200. The compiler 210 may compile the generated code for execution by a target platform, such as a server or an embedded device.

The modeling environment 200 may include other components (not shown), such as a verification engine for analyzing the correctness of a model, a test engine to determine satisfaction of requirements by the model, a differencing engine for comparing two models and identifying the differences between them, a merge engine for merging two models, etc.

In some embodiments, the model editor 204 and/or one or more of the components thereof may be implemented through one or more software modules or libraries containing program instructions pertaining to the methods described herein. The software modules may be stored in a memory, such as a main memory, a persistent memory and/or a computer readable media, of a workstation or other data processing machine or device, and executed by one or more processors. Other computer readable media may also be used to store and execute these program instructions, such as non-transitory computer readable media, including optical, magnetic, or magneto-optical media. In some embodiments, the model editor 204 and/or one or more of the components thereof may comprise hardware registers and combinational logic configured and arranged to produce sequential logic circuits. In some embodiments, various combinations of software and hardware, including firmware, may be utilized to implement the described methods.

In some embodiments, the model editor 204 and/or one or more components thereof, may be separate from the modeling environment 200. In such cases, the model editor 204 may communicate with the modeling environment 200, e.g., through local procedure calls (LPCs), remote procedure calls (RPCs), one or more Application Programming Interfaces (API), or other communication or interface technologies.

In some embodiments, the modeling environment 200 is a high-level modeling application program. Suitable high-level modeling application programs include the MATLAB® algorithm development environment and the Simulink® model-based design environment from The MathWorks, Inc. of Natick, Mass., as well as the Simscape physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, Tex., the Visual Engineering Environment (VEE) from Agilent Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Models constructed in the high-level modeling environment 200 may contain less implementation detail, and thus operate at a higher level than certain programming languages, such as the C, C++, C#, and SystemC programming languages.

The MATLAB® algorithm development environment is a math-oriented, textual programming environment for digital signal processing (DSP) design, among other uses. The Simulink® model-based design environment is a block diagram based design environment for modeling and simulating dynamic systems, among other uses. The MATLAB® and Simulink® environments provide a number of high-level features that facilitate algorithm development and exploration, and support model-based design, including dynamic typing, array-based operations, data type inferencing, sample time inferencing, and execution order inferencing, among others. In the Simulink environment, signals may represent mathematical not physical relationships, and the signal lines or connections of the model may represent these mathematical relationships among the blocks. In the LabVIEW program development environment, wires represent dataflow relationships.

A signal may refer to a time varying quantity having one or more values at points in time during model execution. For example, a signal may have a value at each time step during execution of a model.

In some embodiments, a lower level programming language, such as the C, C++, and C# programming languages, among others, may be used to construct one or more models.

Models, such as the simulation model 300, constructed in the modeling environment 200 may include textual models, graphical models, and combinations of graphical/textual models. A given model, when executed, may simulate, e.g., approximate the operation of, a system. Exemplary systems include physical systems, such as weather systems, financial markets, plants, controllers for factory automation, engine control units (ECUs), anti-lock braking systems (ABS), flight controllers, communication systems, etc. Execution of a model by the modeling environment 200 may also be referred to as simulating or running the model.

The GUI created by the UI engine 202 may include a plurality of graphical affordances, such as a model canvas in which a visual presentation of the model 300 may be displayed. The GUI may also include a menu bar and a command bar. The command bar may include a plurality of command buttons, including a 'Run' button, for selection by a user of the modeling environment 200. Selection of the 'Run' button may cause the modeling environment 200 to run or execute the model 300. In response to the user selecting a Run button or entering a text-based run command in a CLI, or initiating model execution in another manner, such as using a keyboard shortcut, a menu selection, programmatically, etc., the simulation engine 206 may execute the model 300, and may output the results generated by the model 300 during its execution, for example, to the user via a display.

If code is not generated, the model may be executed in an interpretive mode by the interpreter 212 in which a compiled and linked version of the model may be directly utilized to execute the model over the desired time-span.

Model execution may be carried out for one or more model inputs, such as a set of model inputs, and may produce one or more model results or outputs, such as a set of model outputs. Model execution may take place over a time-span. For example, execution may begin at a start time, include one or more time steps, and end at a stop time. The start time, time steps, and end time may be logical and have no correspondence with the physical passage of time. Alternatively, the start time, time steps, and end time may have a correspondence with the physical passage of time and execution may operate in real time or a linearly scaled form of real time (e.g., twice as fast as real time). The selection of the time steps may be determined by the selected solver 218a-c.

The modeling environment 200 may be directed to open a model, such as the model 300, or a portion thereof. An in-memory representation of the received model (or portion thereof) may be stored in memory, while a visual representation of the model may be displayed, e.g., on the canvas. The in-memory representation may be in the form of an Intermediate Representation (IR), such as a Control Flow Graph (CFG), a Data Flow Graph (DFG), a Control/Data Flow Graph (CDFG), or another form of IR. The IR may include nodes that represent elements, e.g., blocks, subsystems, states, etc., of the model. The IR also may include edges that represent signals, data flow, events, state transitions, physical relationships, or other connections or dependencies, among model elements. Nodes of an IR may be implemented through data structures, and edges may be implemented through pointers.

The modeling environment 200 may implement a graphical programming language having a syntax and semantics, and models may be constructed according to the syntax and semantics defined by the modeling environment 200. The model 300 may include blocks representing dynamic systems whose outputs are signals where a signal is a time varying quantity having a value at points in time during execution of a model, for example at each simulation step. A signal may have a number of attributes, such as signal name, data type, numeric type, complexity (whether it has an imaginary part), and dimensionality. Connections among blocks of a model may represent mathematical relationships. In other modeling domains, such as a dataflow domain, connections may represent the flow of data among blocks of the model.

A signal may be represented in a model by an arrow extending between two blocks. For example, the tail of an arrow may connect to an output of a first block and the head of the arrow may connect to an input of a second block. The first block writes to the signal during the evaluation of its methods or equations, while the second block reads the signal during the evaluation of its methods or equations. The arrows of a block diagram may thus represent mathematical relationships among the connected blocks.

The modeling environment 200 may use different line or arrow styles to represent different types of signals. For example, an arrow having a solid line and a black arrow head may represent scalar and non-scalar signals, an arrow having a dash-dot line and a black arrow head may represent control signals, an arrow having a solid line with a white dotted core where the line is wider than the lines used for scalars and control signals may represent a variable-size signal, etc.

Other graphical programming languages may define other connection styles. For example, in the Stateflow® state chart tool, a rectangle with rounded edges may represent a state or a substrate, a small circle may represent a connective junction, and an arrow having a solid line and a white arrow head may represent a transition. Exemplary connection styles are shown in the figures.

Figure 3:
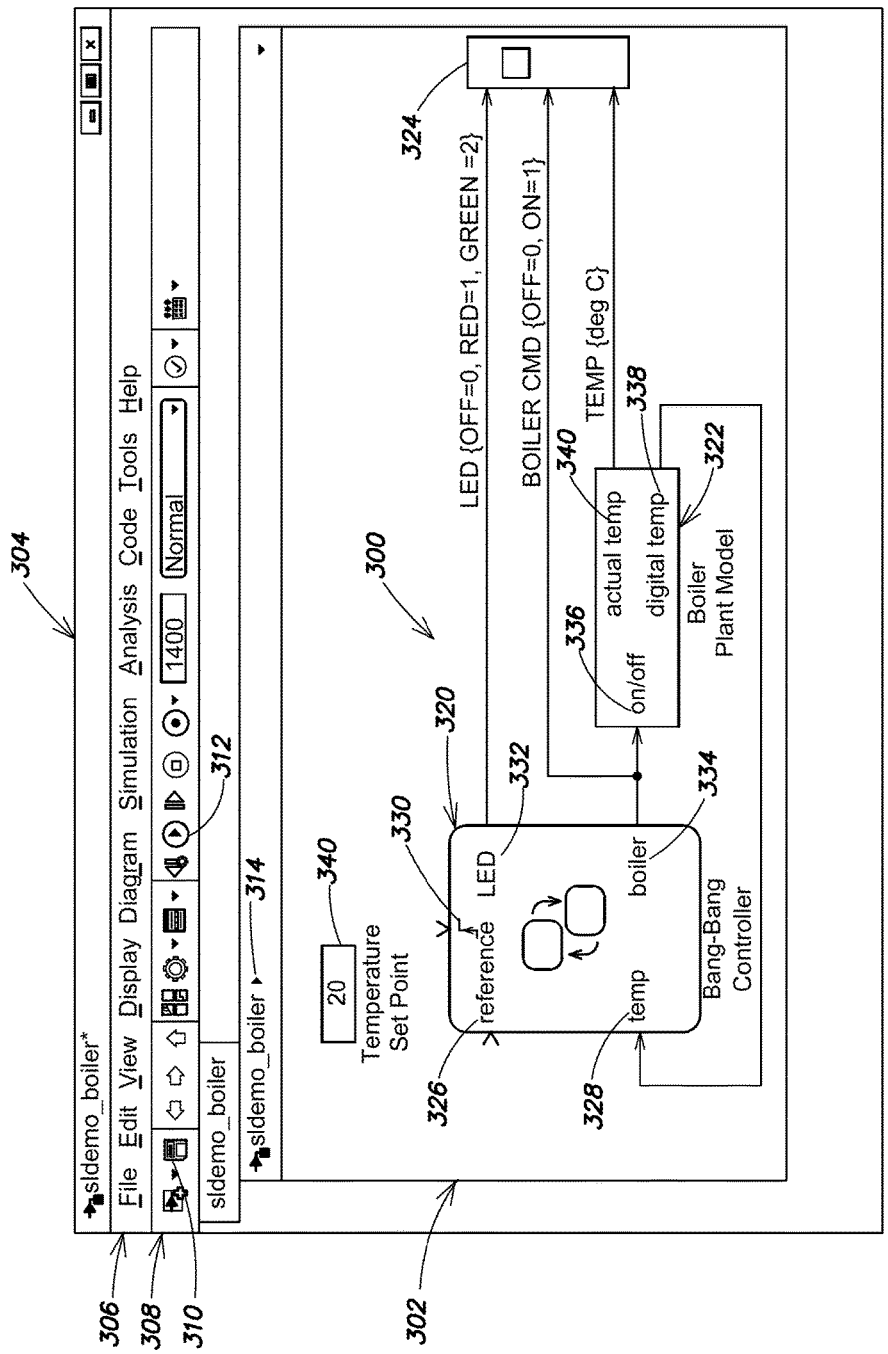
FIG. 3 is a schematic illustration of an example of a model in accordance with an embodiment.

FIG. 3 is a schematic illustration of a visual representation of the model 300 opened in the modeling environment 200 and displayed on a display to a user. The model 300 may be presented on a model canvas 302 in a model editor window 304, and a user may construct, and modify the model 300. For example, a palette may be presented having model element types from the model element type library 222, and the user may select desired model element types from the palette, and place instances of the selected model element types onto the model canvas 302. The user also may establish relationships, such as connections, among elements of the model, which may or may not be visually represented on the model canvas 302. Elements of the model may represent dynamic systems, computations, functions, operations, data stores, events, states, state transitions, etc., and the connections, which may appear as lines among the objects, may represent data, control, signals, events, mathematical relationships, state transitions, physical connections, etc.

In addition to the model canvas 302, the model editor window 304 may include other graphical affordances, such as a menu bar 306 and a toolbar 308. The toolbar 308 may include a plurality of buttons for commonly used commands, such as a Save button 310 and a Run button 312, among others. In response to a user selecting the Run button 312, for example by using a mouse to control a cursor, the simulation engine 206 may execute the model 300. Execution of the model 300 may also be referred to as simulation or simulating the model 300. The model editor window 304 also may include an explorer bar 314 that may provide a hierarchical list of components that make up the model 300 in the form of a horizontally arranged textual string.

The model 300 may include an edge triggered state chart 320 labeled 'Bang-Bang Controller', a subsystem 322 labeled 'Boiler Plant Model', and a Scope block 324. The state chart 320, which models a bang bang controller, may include a plurality of inputs, such as a first (reference) signal input 326, a second (temp) signal input 328, and an edge triggered input event port 330. The state chart 320 also may include a first (LED) signal output 332 and a second (boiler) signal output 334. The boiler control signal output 334 of the state chart 320 may be connected to an input (on/off) 336 of the subsystem 322. The subsystem 322 may include a first (actual temp) signal output 340, and a second (digital temp) signal output 338. The digital temperature (temp) signal output 338 of the subsystem 322 may be connected to the temp signal input 328 of the state chart 320. The LED signal output 332, the boiler signal output 334, and the actual temp signal output 340 may also be connected to the Scope block 324.

A user may modify the model 300, for example a user may add a new element to the model 300 or move an existing element. For example, the user may add a constant block 340 labeled 'Temperature Set Point'. A constant block may output a constant value, which may be user specified. The user may drag the Constant block 340 to a desired location in the model 300. As the user moves the Constant block 340, the model editor 204 may detect the movement, and may present markings, such as guide lines, when the Constant block 340 is aligned on the canvas 302 with other elements of the model 300.

Figure 4:
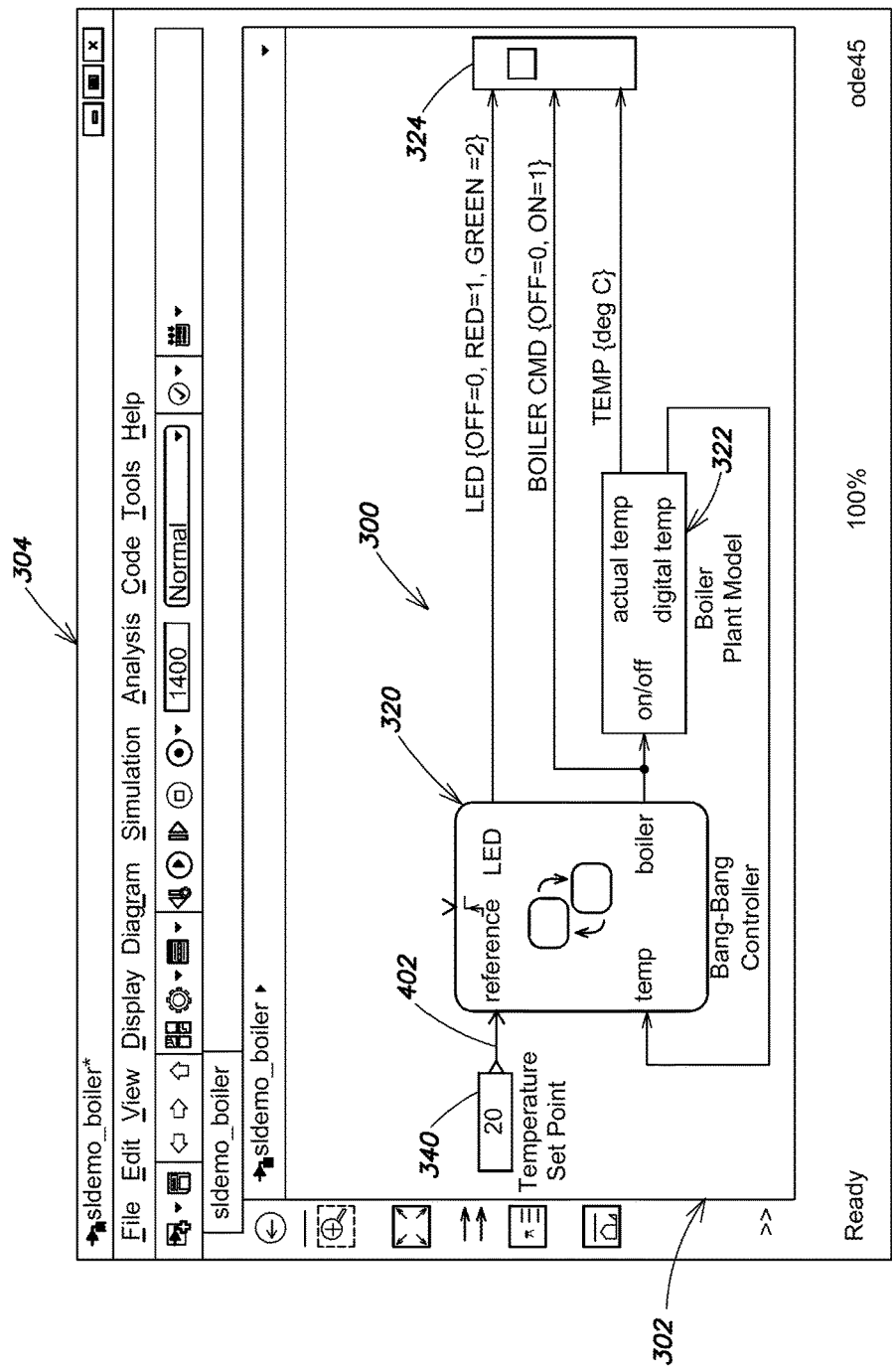
FIG. 4 is a schematic illustration of the model of FIG. 3 in accordance with an embodiment.

If the Constant block 340 is dragged toward the state chart 320, such that the center of the Constant block 340 approaches or reaches an in-line relationship with the state chart's reference signal input 326, as shown in FIG. 4, the block alignment guide 224 may present an alignment line 402 to indicate to the user that the Constant block 340 has reached an in-line relationship with the first input 326 of the state chart 320. In some embodiments, the model editor 204 may present alignment lines based on the display characteristics, e.g., size and location, of elements presented on the canvas 302. For example, alignment lines may be presented between two blocks even though the two elements cannot be connected, e.g., because of a communication direction incompatibility, a data incompatibility, a modeling domain incompatibility, etc.

A system utility of an operating system may notify the prediction engine 226 that the user has dragged the Constant block 340 into an in-line relationship with the state chart's reference signal input 326. The prediction engine 226 may determine whether a semantically and syntactically valid connection may be established between the Constant block 340 and one or more inputs of the state chart 320. For example, the prediction engine 226 may determine that a valid connection can be made with the state chart's reference signal input 326, and/or whether other valid connections are possible, e.g., to some other model element In some embodiments, the prediction engine 226 may determine only whether a semantically valid connection may be established, or only whether a syntactically valid connection may be established.

An exemplary system utility is a window manager of an operating system. A window manager may be responsible for managing the display of windows and other graphical affordances displayed on a display screen of a data processing device. The window manager may act in response to system calls sent from an application program, such as the modeling environment 200, to the operating system via an Application Programming Interface (API) or other communication layer. The window manager may use a graphics system within the operating system to draw and redraw to the display screen of a display device. For example, the window manager may store display information in a screen buffer, and the contents of this buffer may be read out and provided to a display adapter, which may convert the information to a form which can be used to drive the display screen.

The window manager may maintain a coordinate system for the display screen, where objects appearing on the display screen may be assigned x, y, and z coordinates. The units of the coordinate system may be pixels. The model editor 204 may obtain information regarding the position, e.g., the coordinates, of objects displayed on the display screen from the window manager, e.g., through API calls. Using the obtained location information, the model editor 204 may also determine the distances between the displayed objects, as well as other geometric relationships, such as horizontal alignment, vertical alignment, proximity, movement toward, movement away, in-line relationships, etc.

The prediction engine 226 may identify potential targets for the Constant block 340 based on one or more geometric relationships between blocks/ports, etc. To determine whether a valid connection can be made, the prediction engine 226 may analyze one or more attributes of the inputs or outputs of the new block, and one or more attributes of the inputs or outputs of the target block. Exemplary attributes include data types, data dimensions, complexity, modeling domain, block/port behavior, etc.

There may be limitations on the types of connections that may be made to or from model elements based on the syntax and/or semantics of the programming language(s) implemented by the modeling environment 200. For example, for model elements that support dynamic systems that read and write signals, there may be limitations on the types of signals that various model elements may accept. The prediction engine 226 may query the simulation engine 206 to determine what connections may be validly made between a newly added element and an existing element of the model. The simulation engine 206 may perform at least a portion of the model interpretation/compilation process, including checking connections indicated by the prediction engine 226. For example, the simulation engine 206 may perform type checking operations, type inferencing, or other checking or inferencing operations using the proposals from the prediction engine 226, and provide the results to the prediction engine 226. Alternatively, the prediction engine 226 may determine whether a proposed connection is valid.

In the example shown in FIG. 3, the prediction engine 226 may determine that the signal generated by the Constant block 340 is compatible with the signal expected at the state chart's reference signal input 326.

The prediction engine 226 may convey the possible valid connections to the suggestion engine 228, which may present one or more graphical affordances on the canvas for these possible valid connections to or from the new element. The graphical affordances may be ghost or phantom versions of completed connections supported by the modeling environment, which may appear as faded or semi-transparent versions of the respective completed connection, as defined by the model environment 200. It should be understood that other visual cues besides or in addition to a faded or semi-transparent version may be utilized in some embodiments. Other visual cues that may be utilized include highlighting, lowlighting, changing styles, changing colors, changing weights, changing shapes, changing sizes, changing lengths, etc.

FIG. 5 is a schematic illustration of a portion of the model 300. Extending between the Constant block 340 and the state chart's reference signal input 326 is a ghost connection 502. The ghost connection 502 may be presented as a faded or semi-transparent version of the style of a completed connection. For example, if a completed connection is represented by an arrow having a solid black line, the ghost connection 502 may be presented as an arrow with a solid line of the same thickness where the color or grayscale is faded as compared to the color or grayscale used for the completed connection, or where the line is semitransparent as compared to the completed connection, or where the line is a different color, thickness, or style. The ghost connection 502 may extend from the newly added block 340 to the existing block 320 in a similar manner as a completed connection, e.g., from an output port of the newly added block 340 to an input port of an existing block 320 of the model 300. It should be understood that other graphical affordances may be used to distinguish a ghost connection from a regular, completed connection. For example, the ghost connection may have the same appearance as a completed connection, but an additional graphical affordance, such as a shadow, a blinking background, Las Vegas lights, marching ants, shimmer, sparkle, etc. may be added.

In an embodiment, the suggestion engine 228 may detect user interest in a given ghost connection. In response to detecting user interest in a given ghost connection, the suggestion engine 228 may alter the appearance of the given ghost connection. For example, the user may move a cursor 504 toward the ghost connection 502, as indicated by the direction of movement arrow 506, and this movement of the cursor 504 may be detected by the suggestion engine 228, or reported to it by the window manager. In response to detecting the cursor 504 being moved toward the ghost connection 502, the suggestion engine 228 may alter the appearance of the ghost connection 502. In an embodiment, the suggestion engine 228 may alter the ghost connection's appearance, for example by giving it more substance thus making it more visible, e.g., less faint and/or less transparent. FIG. 6 is a schematic illustration of a portion of the model 300 having a more substantial ghost connection 602 in response to the user moving the cursor 504 toward the ghost connection 602. For example, the suggestion engine 228 may change the color of the ghost connection from a light blue or gray to a darker blue or gray.

Figure 7:
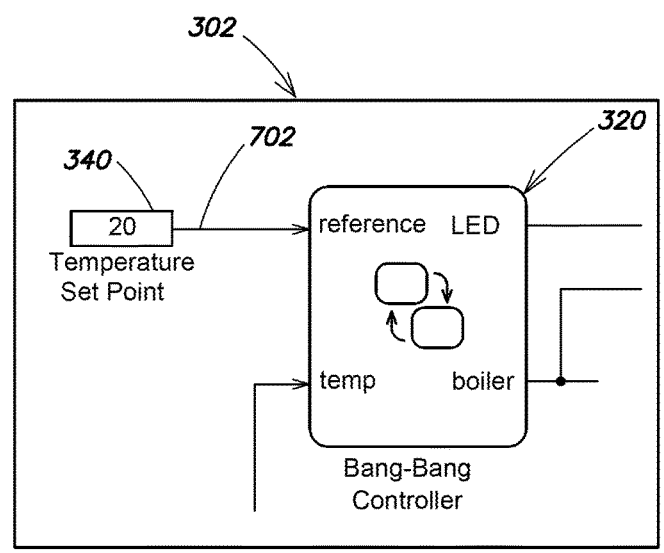
FIG. 7 is a schematic illustration of a portion of the model of FIG. 3 in accordance with an embodiment.

To the extent a particular ghost connection, as presented by the suggestion engine 228 represents a next step in the construction or editing of a model, as determined by the prediction engine 226, the user may select the particular ghost connection, and that selection may be received by the model editor 204. In response to receiving a selection of a particular ghost connection, the suggestion engine 228 may change the ghost connection into a completed model connection according to the syntax and semantics defined by the modeling environment 200. For example, if the modeling environment 200 supports time-varying signals whose form is a black arrow with a thin solid line, the suggestion engine 228 may convert the ghost connection 502, 602 to a black arrow with a thin solid line. FIG. 7 is a schematic illustration of a portion of the model 300 where the ghost connection 602 has been converted to a completed connection 702 in accordance with the syntax and semantics of the modeling environment 200. The selection of a particular ghost connection may be performed by a user, e.g., using an input device, such as a mouse to control the pointer, a touch pen, etc. That is, the user may examine the ghost connections presented on the canvas 302, and may choose one or more of them.

In some embodiments, a ghost connection may have a reduced length as compared to a completed connection, as illustrated in FIGS. 5 and 6.

In addition, the suggestion engine 228 may cause a new component to be added to the in-memory representation of the model where the new component corresponds to the completed connection. For example, the suggestion engine 228 may add a new edge to the in-memory representation. In addition, the suggestion engine 228 may locate the new edge and configure its attributes or parameters based on the completed connection 702 within the model 300. Here, the suggestion engine 228 may place the new edge between the nodes of the in-memory representation that represent the Constant block and the state chart, and may configure the edge's attributes, such as signal dimension, signal type, domain, etc. based on the output signal dimension, signal type connection, etc. written by the Constant block.

Changing a ghost connection to a completed connection may include converting the ghost connection to the completed connection, or replacing the ghost connection with the completed connection In the LabVIEW graphical programming system, blocks are interconnected with wires that represent dataflow relationships, and a LabVIEW model is referred to as a virtual instrument. The wires may have different colors, thicknesses, and styles depending on the data type being represented. For example, thin orange or blue wires represent scalars, thicker orange or blue wires represent one dimension (1-D) arrays, and blue or orange pipes represent two dimension (2D) arrays. Boolean and Strings are represented by dotted wires and wavy wires, respectively. The suggestion engine 228 may create ghost versions of these connection types as well.

Other modeling environments may use other graphical or visual elements to represent connections among blocks or other model objects. Ghost versions of these elements may also be supported.

Following the selection of a particular ghost connection and the conversion of that ghost connection to a completed connection, the suggestion engine may remove any other ghost connections that were temporarily displayed.

Figure 8:
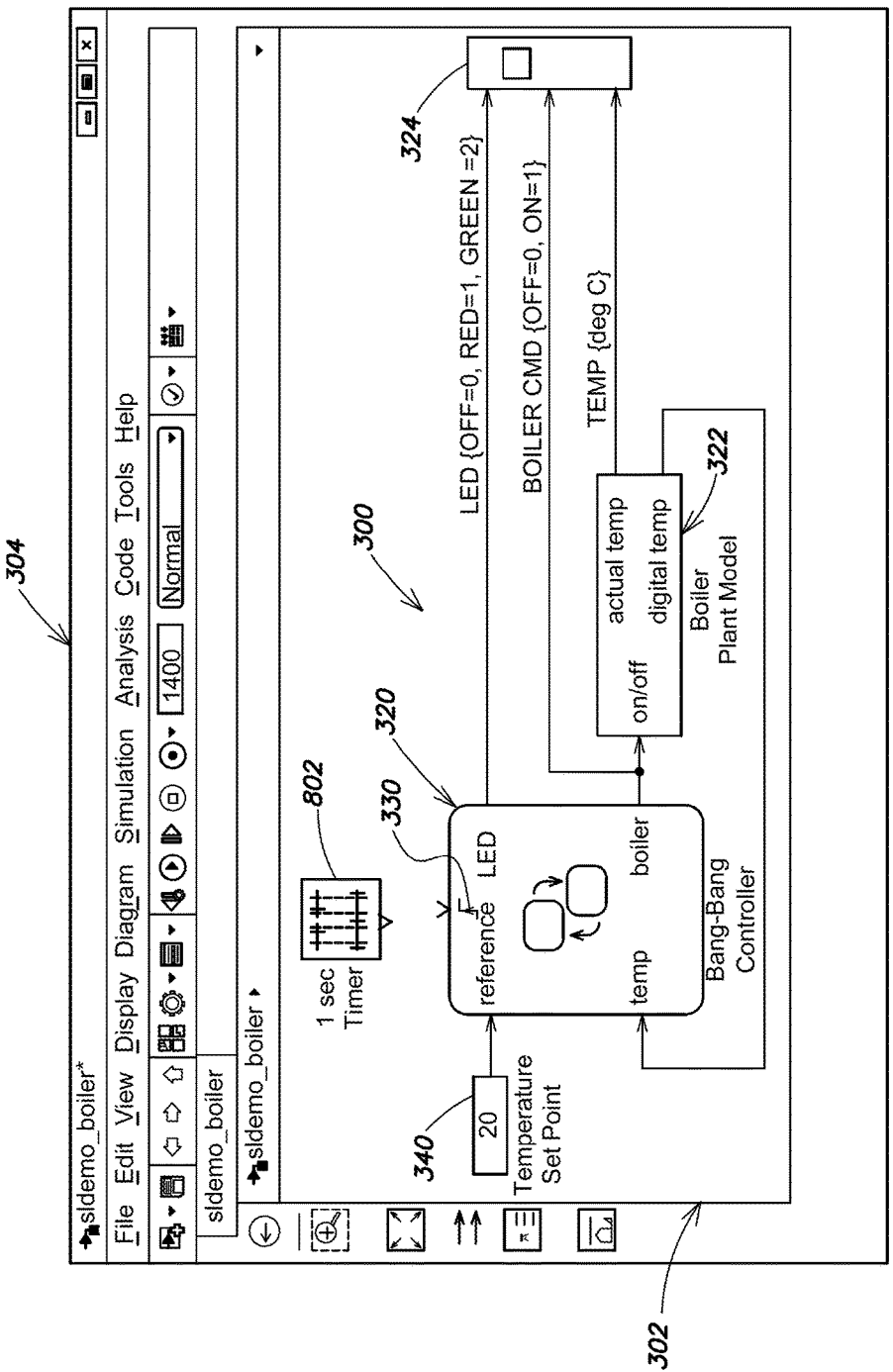
FIG. 8 is a schematic illustration of the model of FIG. 3 in accordance with an embodiment.

In an embodiment, the prediction engine 226 may also predict a connection to the edge triggered input event port 330 of the state chart 320. FIG. 8 is a schematic illustration of the model 300. Suppose a user adds a Pulse Generator block 802 labeled '1 sec. Timer' to the model 300, and moves the Pulse Generator block 802 toward and/or into an in-line relationship with the state chart's edge triggered input event port 330. A Pulse Generator block may generate square wave pulses at regular intervals during execution. The prediction engine 226 may detect that the Pulse Generator block 802 is being dragged toward and/or into an in-line relationship with the state chart's edge triggered input event port 330. The prediction engine 226 may determine that the wave pulses produced by a Pulse Generator block can provide valid edge triggered events for a state chart. The prediction engine 226 may notify the suggestion engine 228 that the Pulse Generator block 802 is being moved toward and/or into an in-line relationship with the edge triggered input event port 330, and that it can provide a valid connection with the edge triggered event port 330. The suggestion engine 228 may present a ghost connection between the Pulse Generator block 802 and state chart's the edge triggered input event port 330.

Figure 9:
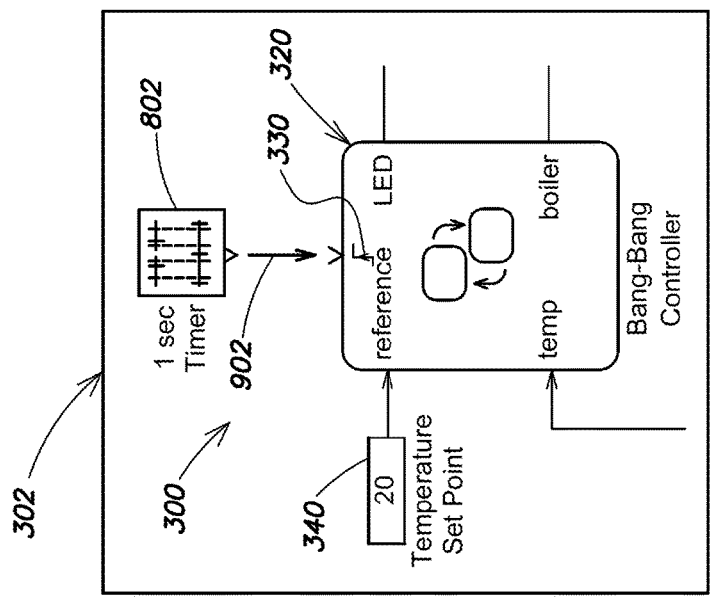
FIG. 9 is a schematic illustration of a portion of the model of FIG. 3 in accordance with an embodiment.

FIG. 9 is a schematic, partial illustration of the model 300. A ghost connection 902 is included from the Pulse Generator block 802 to the state chart's edge trigger input event port 330. If the user selects the ghost connection 902, the suggestion engine 228 may convert the ghost connection 902 to a completed signal connection according to the syntax and semantics of the modeling environment 200.

Figure 10:
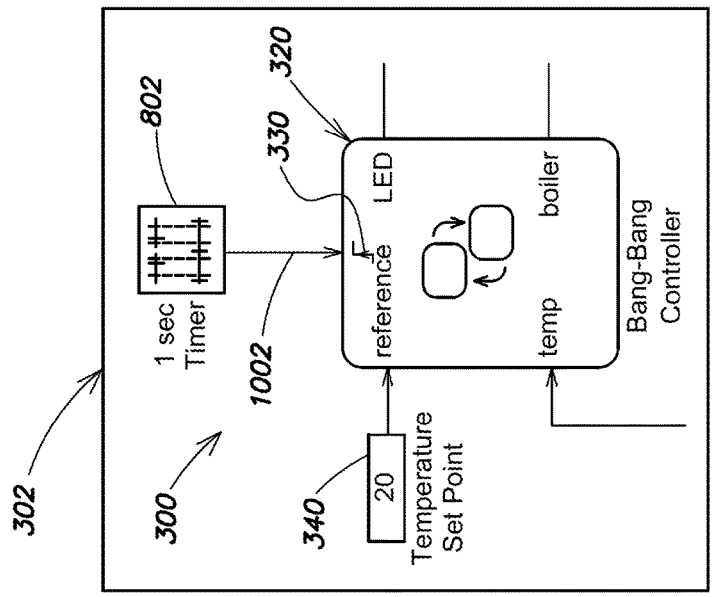
FIG. 10 is a schematic illustration of a portion of the model of FIG. 3 in accordance with an embodiment.

FIG. 10 is a schematic, partial illustration of the model 300. The ghost connection 902 has been replaced with a completed connection 1002 from an output of the Pulse Generator block 802 to the state chart's edge trigger input port 330, e.g., in response to user input. The suggestion engine 228 may also cause a new edge to be added to the in-memory representation of the model 300, and may configure the edge so that the Pulse Generator block 802 writes to the signal, while the state chart 320 reads from the signal as an edge trigger input event.

The prediction engine 226 may predict one or more next steps in the construction of a model in response to other editing actions besides adding a new block to a model and/or moving a new or existing block within a model.

Figure 11:
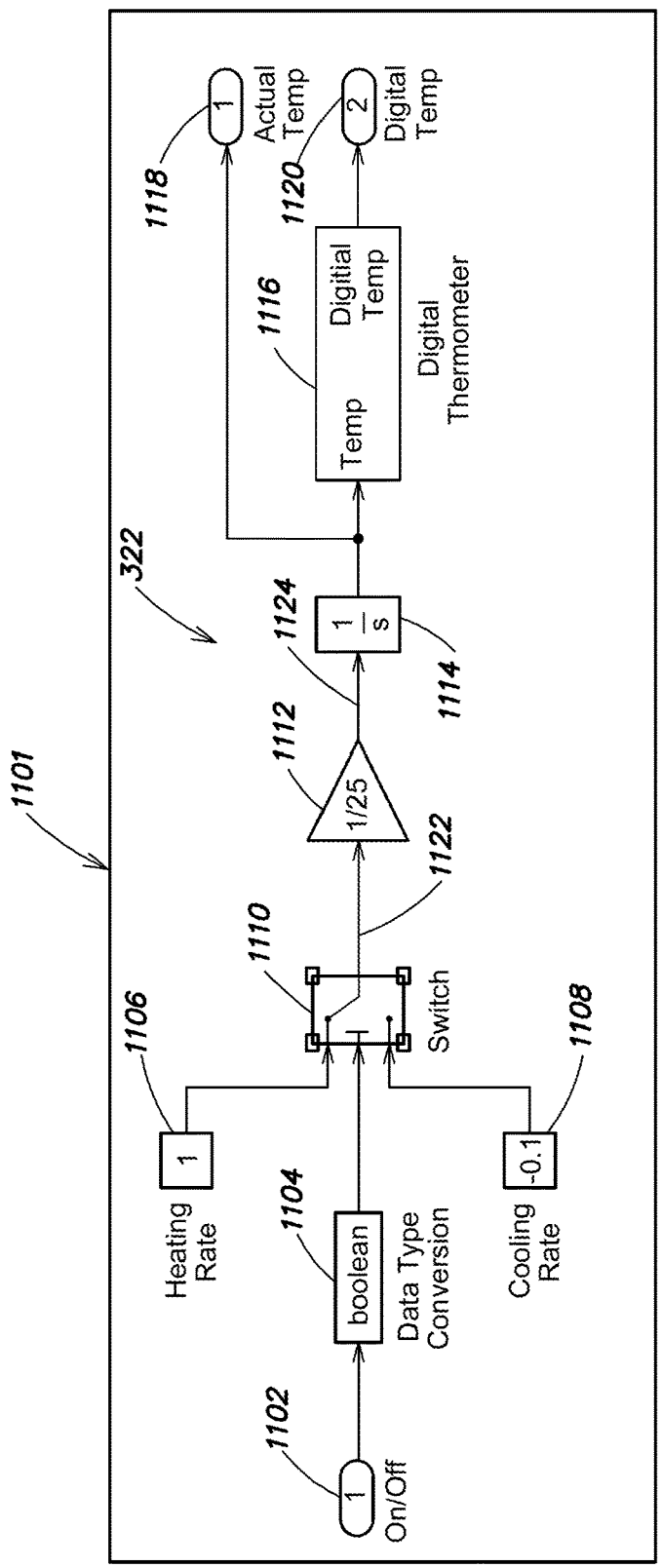
FIG. 11 is a schematic illustration of a portion of the model of FIG. 3 in accordance with an embodiment.

FIG. 11 is a schematic illustration of the Boiler Plant Model subsystem 322, which has been opened on a canvas 1101 to show the elements that form the subsystem 332. The subsystem 322 may include an Inport (on/off) block 1102, a Data Type Conversion block 1104, first and second Constant blocks 1106 and 1108, a Switch block 1110, a Gain block 1112 an Integrator block, 1114, a subsystem (digital thermometer) block 1116, and first and second Outport blocks 1118 and 1120. An input port of the Gain block 1112 may be connected to an output port of the Switch block 1110 as indicated by a first signal arrow 1122. An output port of the Gain block 1112 may be connected to an input port of the Integrator block 1114 as indicated by a second signal arrow 1124. In modifying the Boiler subsystem 322, a user may delete one or more blocks, such as the Gain block 1112.

Figure 12:
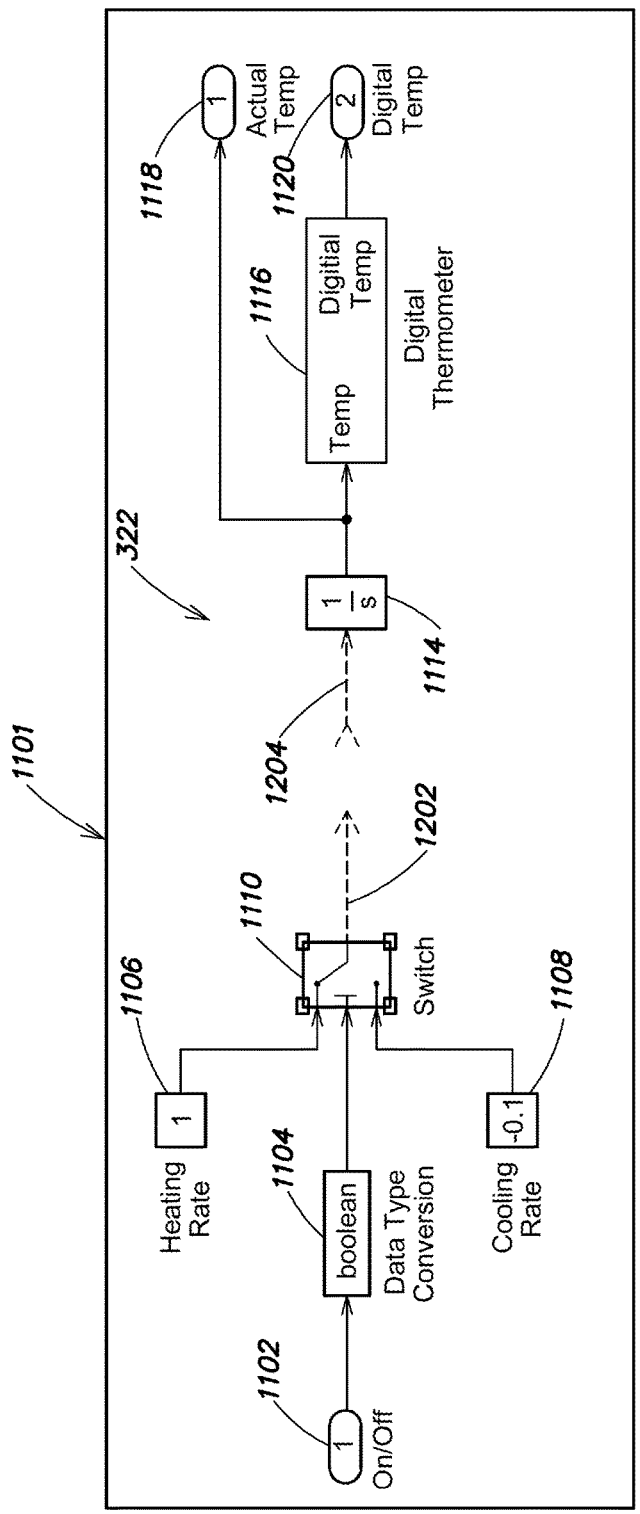
FIG. 12 is a schematic illustration of a portion of the model of FIG. 3 in accordance with an embodiment.

FIG. 12 is a schematic illustration of the Boiler subsystem 322 following the deletion of the Gain block 1112. The model editor 204 may alter the style of the first and second signal arrows 1122 and 1124 to indicate that they are no longer connected. For example, the model editor 204 may provide a first dashed signal arrow 1202 and a second dashed signal arrow 1204.

The prediction engine 226 may determine that a valid connection may be made from the output port of the Switch block 1110 to the input port of the Integrator block 1114. The prediction engine 226 may also conclude that the next step in the construction of the subsystem 322, following the deletion of the Gain block 1112, is to connect the Switch block 1110 directly to the Integrator block 1114. The prediction engine 226 may reach this possibility based on topological information of the model, such as a determination that there is no longer any block separating the Integrator block 1114 from the Switch block 1110. Topological information may include a degree of connectivity between two blocks. For example, the two blocks may be widely separated geometrically, e.g., at opposite ends of a model, and yet be close together topologically because they are separated by one or two other blocks. The topological information may include historical information regarding previous states of the model, e.g., prior to the current edit or revision. The prediction engine 226 may notify the suggestion engine 228 of this possible next step in the construction or modification of the subsystem 322.

Figure 13:
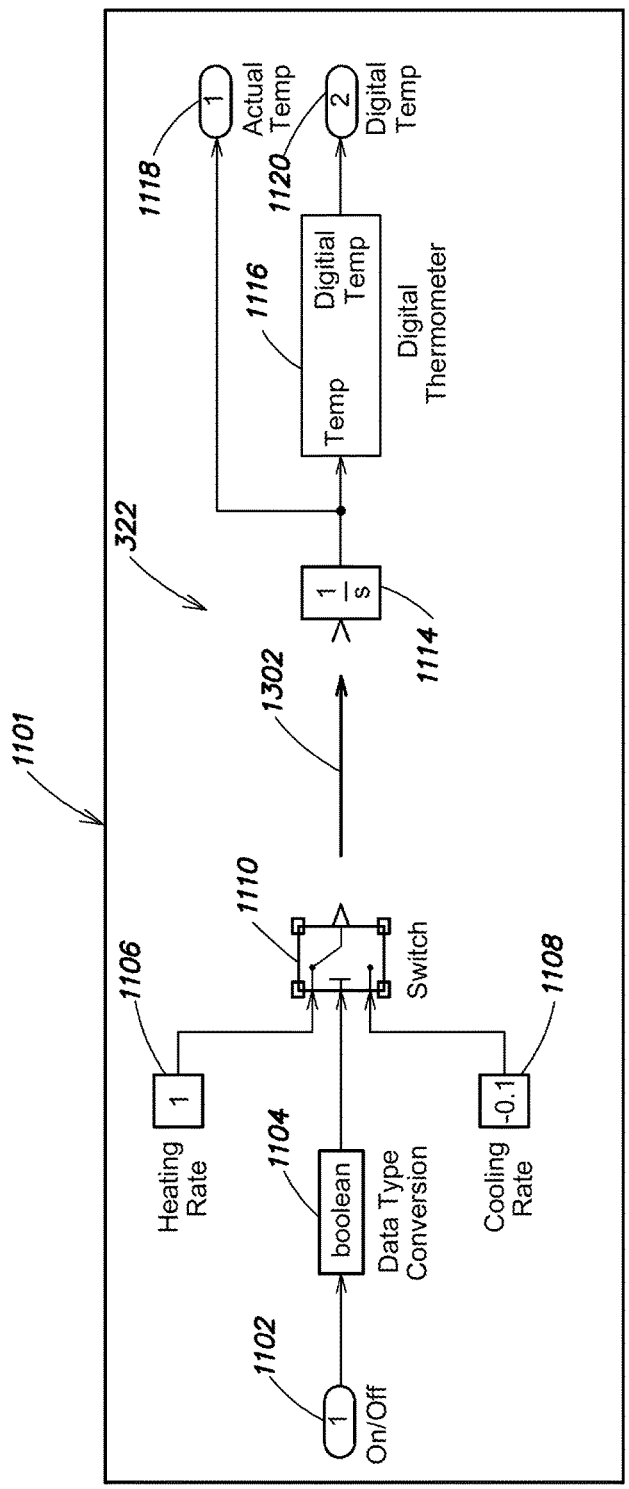
FIG. 13 is a schematic illustration of a portion of the model of FIG. 3 in accordance with an embodiment.
Figure 14:
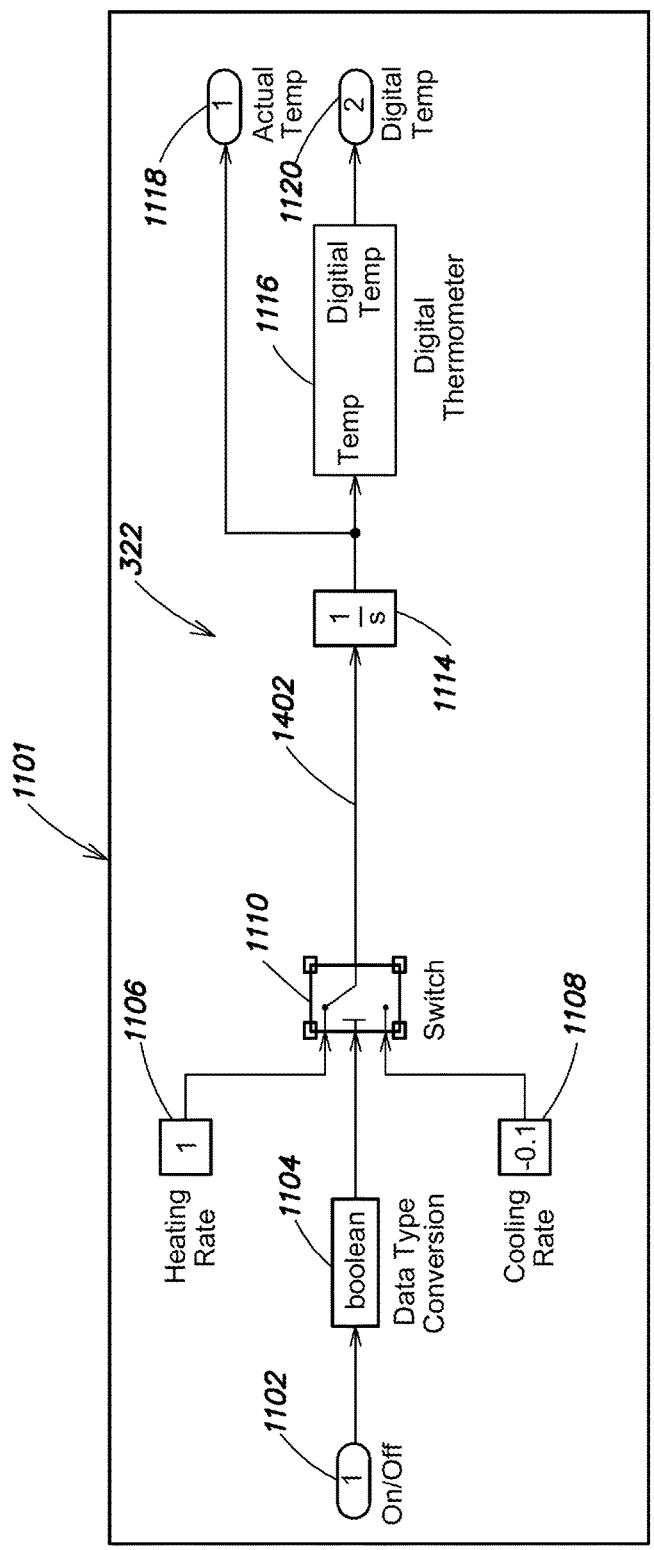
FIG. 14 is a schematic illustration of a portion of the model of FIG. 3 in accordance with an embodiment.

The suggestion engine 228 may cause a ghost connection to be presented on the canvas 1101 thereby proposing, in a visual manner, this next step to the user. FIG. 13 is a schematic illustration of the subsystem 322. A ghost connection 1302 is included suggesting a next step in the construction or modification of the subsystem 322. If the ghost connection 1302 represents a next step that the user wants to take, with regard to the creation or modification of the subsystem 322, the user may select the ghost connection 1302. The suggestion engine 228 may replace the ghost connection 1302 with a completed connection. FIG. 14 is a schematic illustration of the subsystem 322 having a completed signal connection 1402 between the Switch block 1110 and the Integrator block 1114.

As a model is being constructed, the prediction engine 226 may access topological information of the model elements of the model. Topological information may be generated by the model editor 204, and the topological information may be stored in memory, e.g., as one or more data structures. In some embodiments, the prediction engine 226 may generate topological information. The prediction engine 226 may evaluate the topological information for the model as model elements are added and removed from the model. The prediction engine 226 may utilize topological information for a model to identify a suggested next step in response to a model editing operation, e.g., performed by the user. For example, a first model element may be located in between two other model elements. In response to the first model element being moved out of the way of the other two model elements, the prediction engine 226 may determine whether a valid connection may be made between the two other model elements. If so, the suggestion engine 228 may present a ghost connection between the two other model elements. If the user selects the ghost connection, the suggestion engine 228 may convert it to a completed connection.

In addition to suggesting connections, the model editor 204 may suggest other next steps in the process of constructing or modifying a model.

Figure 15:
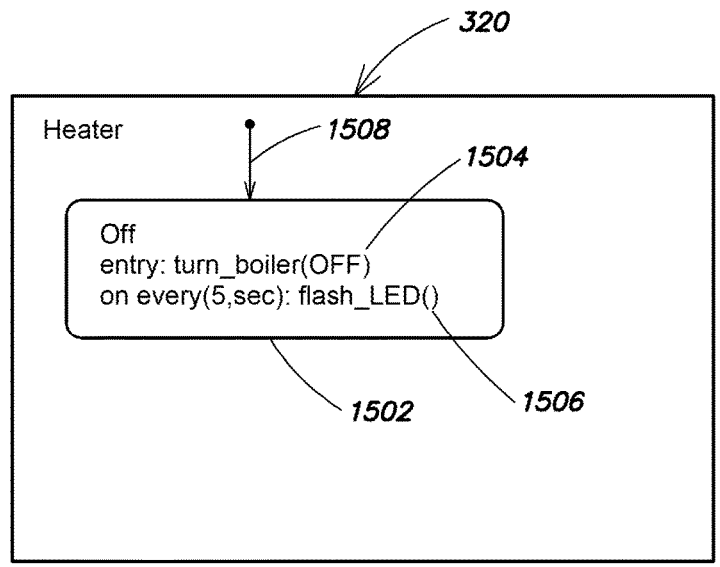
FIG. 15 is a schematic illustration of a portion of the model of FIG. 3 in accordance with an embodiment.
Figure 16:
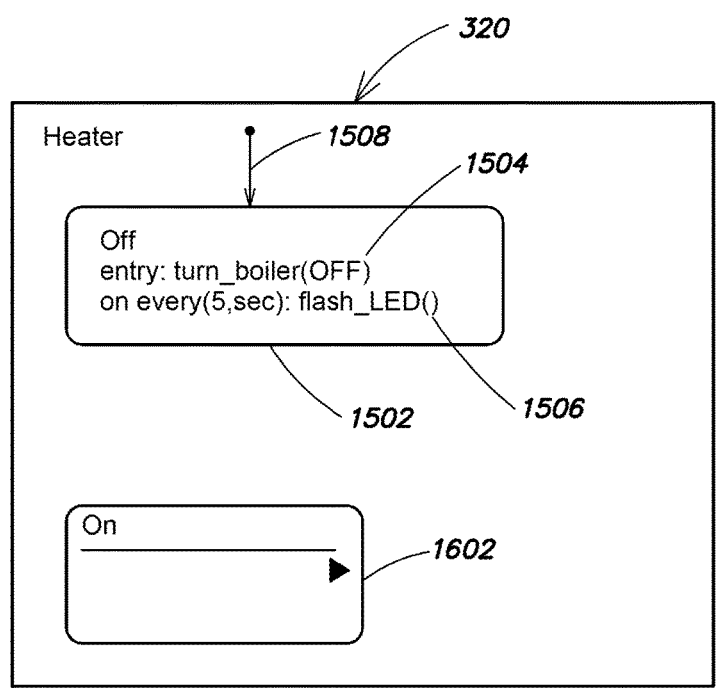
FIG. 16 is a schematic illustration of a portion of the model of FIG. 3 in accordance with an embodiment.

FIG. 15 is a schematic illustration of the controller state chart 320 of the model 300 as it is being constructed or modified. The state chart 320 includes a first (Off) state 1502, which includes first and second action statements 1504 and 1506, and a default transition 1508 for entering the first (Off) state 1502. Suppose a user adds another state to the state chart 320. FIG. 16 is a schematic illustration of the controller state chart 320 with a second (On) state 1602. The prediction engine 226 may determine that transitions may be provided between the first (Off) state 1502 and the newly added second (On) state 1602. For example, the prediction engine 226 may determine that, according to the syntax and/or semantics of the modeling language supported by the modeling environment 200, a transition can be defined from the first (Off) state 1502 to the second (On) state 1602, and from the second (On) state 1602 to the first (Off) state 1502. The prediction engine 226 may notify the suggestion engine 228 of these possible next steps in the construction or modification of the controller state chart 320, and the suggestion engine 228 may present one or more phantom objects to represent these possible next steps.

Figure 17:
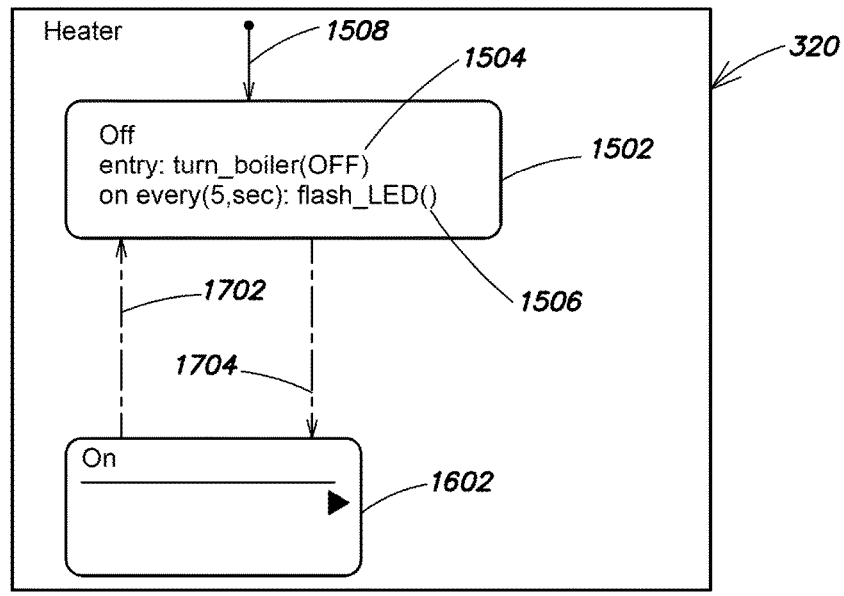
FIG. 17 is a schematic illustration of a portion of the model of FIG. 3 in accordance with an embodiment.
Figure 18:
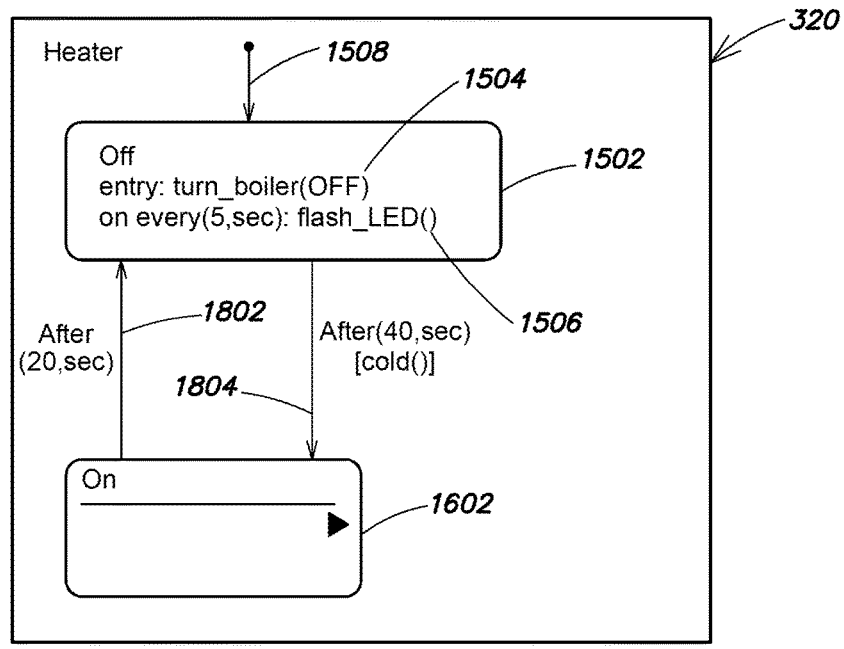
FIG. 18 is a schematic illustration of a portion of the model of FIG. 3 in accordance with an embodiment.

FIG. 17 is a schematic illustration of the controller state chart 320. The state chart 320 includes a first ghost transition 1702 from the second (On) state 1602 to the first (Off) state 1502, and a second ghost transition 1704 from the first (Off) state 1502 to the second (On) state 1602. If the user selects these ghost transitions 1702 and 1704, the suggestion engine 228 may convert them to completed transitions. FIG. 18 is a schematic illustration of the controller state chart 320. Here, the first and second ghost transitions 1702 and 1704 have been converted to first and second completed transitions 1802 and 1804. In addition, the user has textually specified conditions or events associated with the first and second completed transitions 1802 and 1804, although it should be understood that, in some embodiments, the user may not textually specify conditions or events. In some embodiments, the completed transitions may be placed in the same locations on the model as the ghost transitions, or they may be placed in other locations on the model.

It should be understood that The model editor 204 may create additional ghost elements in addition to connections, states, and transitions that predict one or more next steps in a model's creation or modification.

Figure 19:
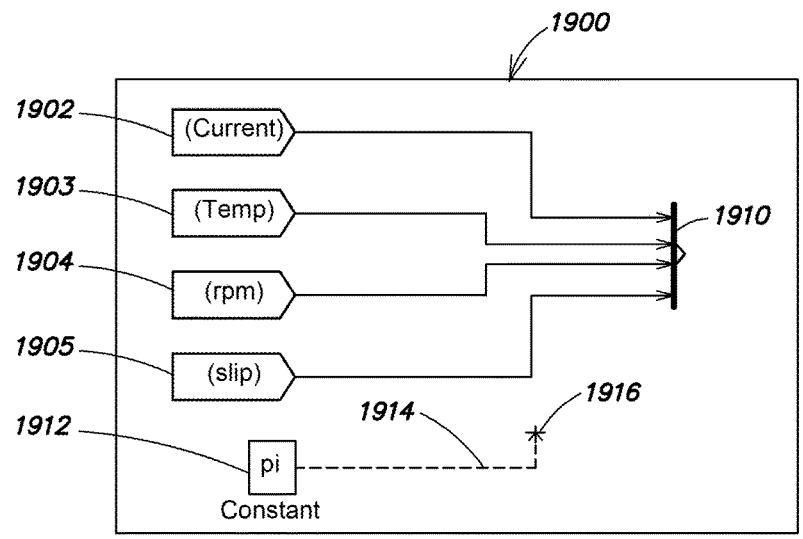
FIG. 19 is a schematic illustration of a portion of another example of a model in accordance with an embodiment.

FIG. 19 is a schematic illustration of a portion of a second model 1900. The second model 1900 includes first (current), second (temp), third (rpm), and fourth (slip) From Workspace blocks 1902-1905 that are connected to a Multiplexer (Mux) block 1910. The From Workspace blocks may output the values of variables read from a workspace associated with a model. The Mux block may be designed to combine multiple inputs into a single vector output. The elements of the vector output signal may follow the top to bottom order of the Mux block's input ports. A configuration pane may be used to specify the number of input ports for a Mux block. The Mux block 1910 of the model 1900 has four input ports to receive the signals from the four From Workspace blocks 1902-1905. Suppose a user adds a new block to the model 1900, such as a Constant (pi) block 1912. Suppose also that the user begins drawing a connection from an output port of the Constant block 1912, e.g., using the mouse, as indicated by dashed line 1914, and that a cursor 1916, represented by a '+' sign, marks the current end point of the connection 1914 being drawn from the Constant block 1912.

Suppose the user drags the cursor 1916 toward the Mux block 1910 thereby also extending the dashed line 1914 toward the Mux block 1910. Based on its knowledge of the syntax and semantics of the graphical programming language implemented by the modeling environment 200, including the attributes of the Constant block 1912 and the Mux block 1910, the prediction engine 226 may conclude that a next step in the construction or modification of the model 1900 may be to connect the Constant block 1912 to the Mux block 1910. Specifically, while the Mux block 1910 may have been originally configured with four input ports, each of which is already connected to a respective signal, the prediction engine 226 may infer or have information that an attribute of a Mux block is the ability to re-configure its number of input ports. The prediction engine 226 may notify the suggestion engine 228 of this possible next step.

Figure 20:
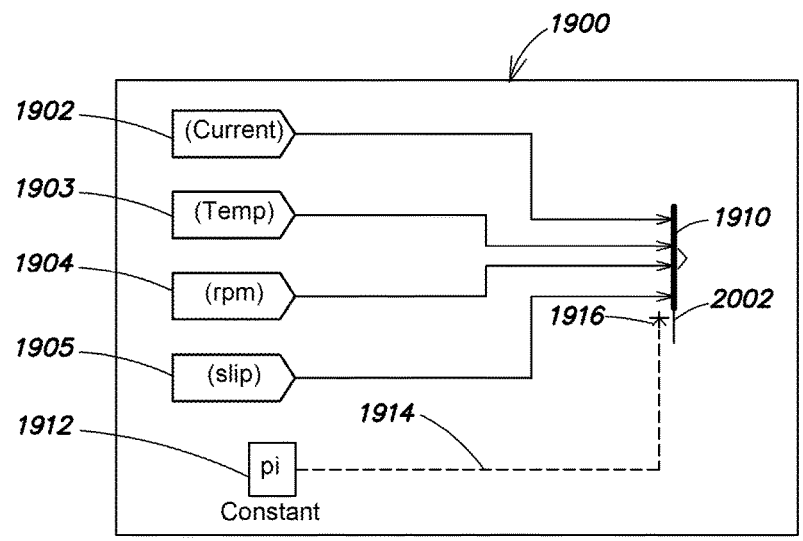
FIG. 20 is a schematic illustration of a portion of the model of FIG. 19 in accordance with an embodiment.

The suggestion engine 228 may cause a ghost port to be presented on the Mux block 1910. FIG. 20 is a schematic illustration of the second model 1900. A ghost port 2002 has been added to the Mux block 1910. The ghost port 2002 may be presented or displayed in a manner that renders the ghost port visibly distinct from the appearance of an existing or fixed port of the Mux block. For example, if an existing port of the Mux block appears in the form of a closing-angle bracket or greater than symbol, e.g., >, having a black color, the ghost port 2002 may also be a closing-angle bracket or greater than symbol, but in a faded or transparent color or grayscale as compared to an existing port. In addition, where the newly added block, e.g., the Constant block 1912 is in the bottom position of the set of blocks 1902-1905 connected to the input ports of the Mux block 1910, the suggestion engine 228 may place the ghost port 2002 at the bottom of the input ports to the Mux block 1910.

Figure 21:
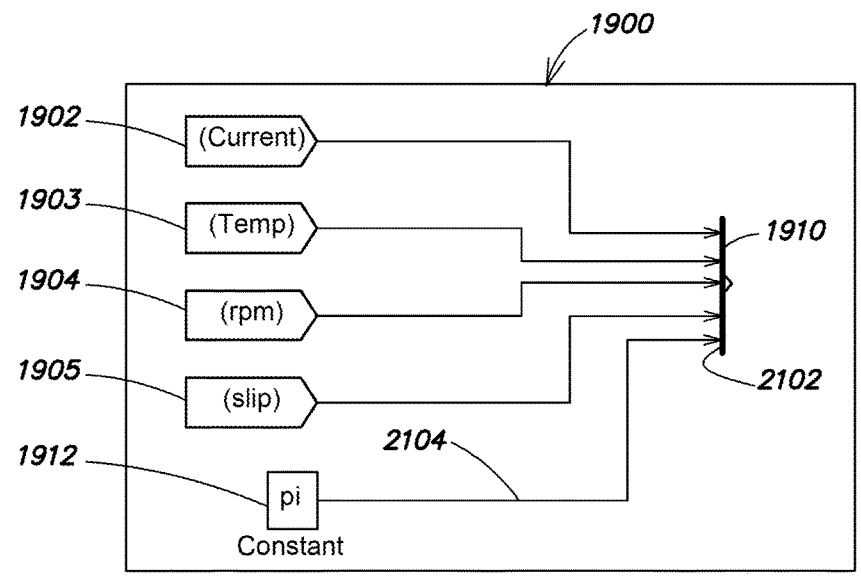
FIG. 21 is a schematic illustration of a portion of the model of FIG. 19 in accordance with an embodiment.
Figure 22:
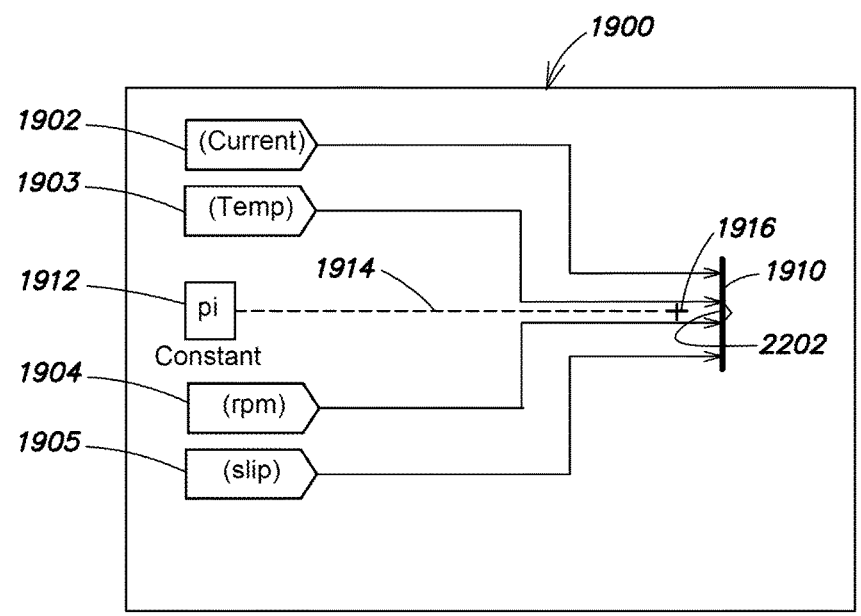
FIG. 22 is a schematic illustration of a portion of the model of FIG. 19 in accordance with an embodiment.

The suggestion engine 228 may present a ghost port when the cursor, dragging the end of a connection line being drawn, gets within a certain distance or proximity from the block on which the ghost port will be provided. If the user connects the line 1914 being drawn to the ghost port 2002, the suggestion engine 228 may convert the ghost port 2002 to a completed port. FIG. 21 is a schematic illustration of the model 1900 where the user has connected the line being drawn to the ghost port 2002. Here, the former ghost port 2002 (FIG. 20) is replaced with a completed port 2102, and the line 1914 is replaced with a completed connection 2104. The arrowhead of a signal arrow may overlay a port symbol such that, with the signal arrow attached, the port symbol is not visible. If a modeling environment does not show ports to which arrows or lines are connected, then the suggestion engine 228 may simply remove the ghost port 2002 from the model 1900.

Where the location of a port has a semantic meaning for the operation of a block, the suggestion engine 228 may account for this semantic meaning when presenting a ghost port. For example, as noted, the order of elements in the output vector of a Mux block may be based on the top down order of the Mux block's input ports. In this case, the suggestion engine 228 may add a ghost input port to a Mux block based on the top down order of a newly added block relative to the other blocks already providing inputs to the Mux block. FIG. 22 is a schematic illustration of the model 1900. Here, the Constant block 1912 has been added to the model 1900 in between the second and third From Workspace blocks 1903 and 1904. Accordingly, the suggestion engine 228 may add a ghost input port 2202 that is positioned on the Mux block 1910 in between the input ports to which the second and third From Workspace blocks 1903 and 1904 are connected. In some embodiments, the position of the ghost port may depend on where the cursor is moved to or placed. For example, if a user were to move up the cursor 1916, as the cursor crosses the connection from block 1903, the ghost port may be shown positioned between the connection from block 1902 and block 1903.

Modeling Templates

The second storage unit 232 may include predefined modeling templates, such as commonly used model fragments or portions. For example, in the case of automotive systems, the second storage unit 232 may include modeling templates or exemplary models for an internal combustion engine, an automatic transmission controller, a power window controller, and an automatic climate control systems, among others. In the case of aerospace systems, the second storage unit 232 may include modeling templates or exemplary models for an air traffic control radar design and an aircraft longitudinal flight control, among others. It should be understood that these are only a few examples of the modeling templates that may be included in the second storage unit 232. The modeling templates may be created by the entity that created the modeling environment 200. Alternatively or additionally, custom modeling templates may be created, e.g., by a user, and added to the second storage unit 232. Thereafter, a user may select one of these custom modeling templates during the construction or modification of a model.

A modeling templates may be in the form of a sub-model, a subsystem, a state chart, a subchart, a virtual instrument (VI), a subVI, an unorganized collection or group of blocks, states, connections, or other model elements, etc.

In an embodiment, a modeling template may be added to a model being constructed. A modeling template may include a plurality of elements, such as blocks, connections, etc. arranged to perform a function, procedure, or operation. One or more of the elements of the modeling template may be presented as a ghost element, and a user may choose a particular ghost element thereby "realizing" that element in the model being constructed. In addition, a modeling template may include multiple alternatives for a given element. All or at least some of the alternatives may be presented, e.g., as ghost elements, in the modeling template, and a user may choose a desired element from the various alternatives that are available.

FIGS. 23-26 are schematic illustrations of a model editor window 2300 illustrating a workflow for constructing at least a portion of a model based on a modeling template. FIG. 27 is a flow diagram of a method in accordance with an embodiment.

Figure 23:
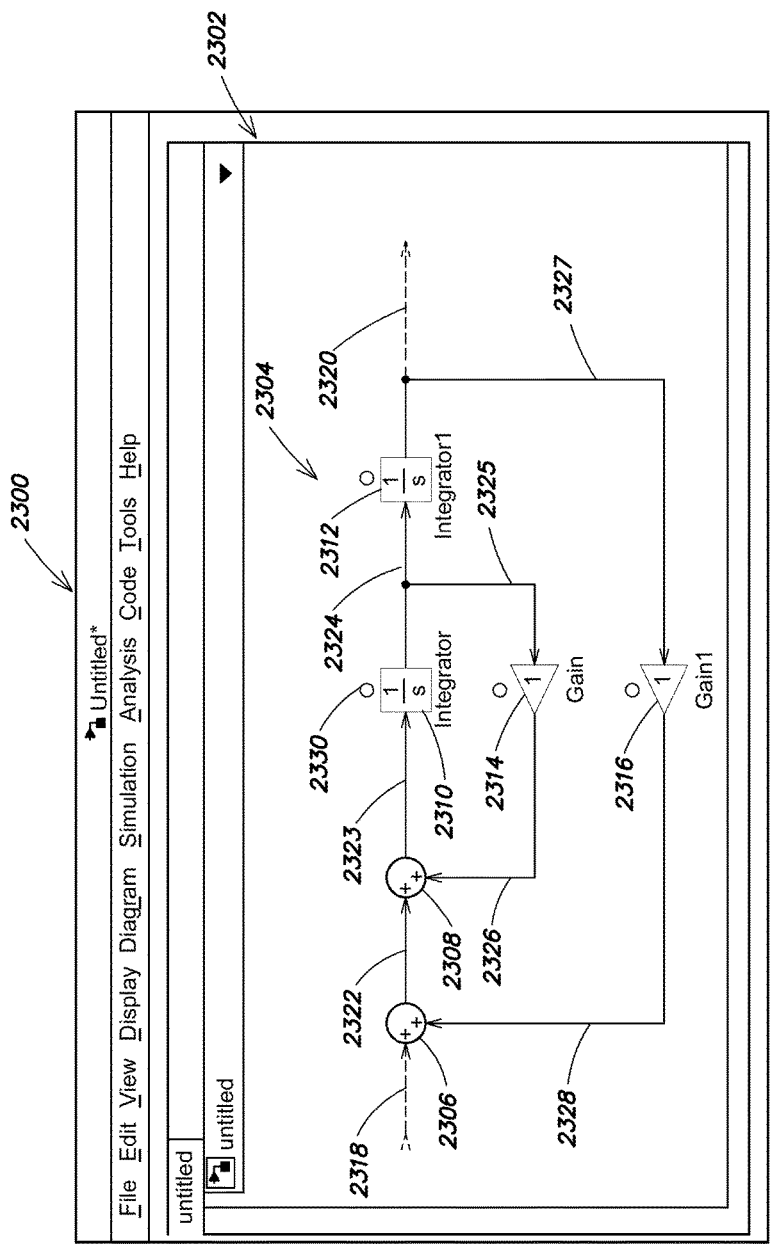
FIG. 23 is a schematic illustration of an example of a model editor window illustrating a template workflow in accordance with an embodiment.

Referring to FIG. 27, the suggestion engine 228 may receive a command or other indication to add a modeling template to a model, as indicated at step 2702. For example, the model editor 204 may present a palette having one or more modeling templates, and a user may select a desired modeling template from the palette. In response to the selection of a desired modeling template, the suggestion engine 228 may retrieve the selected modeling template from the second storage unit 232 and add an instance of that modeling template to a model, as indicated at step 2704. Referring to FIG. 23, a model editor window 2300 may include a canvas 2302 for constructing and/or modifying a model, and a selected modeling template 2304 may be presented on the canvas 2302. The modeling template 2304 may implement a double integration function. The modeling template 2304 may include a plurality of model elements arranged to implement the double integration functionality of the selected template. For example, the modeling template 2304 may include a first sum block 2306, a second sum block 2308, a first integrator block 2310, a second integrator block 2312, a first gain block 2314, and a second gain block 2316. The modeling template 2304 also may include a plurality of connections among the blocks. For example, the modeling template 2304 may include an input signal connection 2318, and an output signal connection 2320. In addition, the modeling template 2304 may include first through seventh signal connections 2322-2328, among the block elements of the template model 2304. Because the input and output signals 2318 and 2320 are unconnected, e.g., hanging, they may be presented in a different form than connected connections, such as in dashed red line form.

The first and second integrator blocks 2310 and 2312 may be designed to output the value of the integral of their input signals with respect to time. The first and second gain blocks 2314 and 2316 may be designed to multiply their input signals by a constant value, namely the blocks' gain value or parameter.

It should be understood that modeling templates may be selected in other ways. For example, a generic template icon block may be selected from a palette, and an instance of the generic template icon or block added to a model. The generic template icon may include a search field for receiving search terms, and a user may enter one or more search terms, such as 'double integrator', in the block's search field to locate a desired template. The generic template icon may thus represent an access point for performing searches for modeling templates. In response, the suggestion engine 228 may search the second storage unit 232 for templates whose tags match the one or more search terms entered in the search field. The suggestion engine 228 may present a list of matching modeling templates by name. The user may select a desired modeling template from the search result list, and an instance of the selected modeling template may be added to the model. In addition, a search feature may be included in the palette from which modeling templates are selected. Those skilled in the art will recognize that other alternatives may be used.

In some embodiments, the suggestion engine 228 may select a modeling template based on the construction of a model. For example, as a user adds blocks to a model and connects them, the suggestion engine 228 may compare the model under construction to the modeling templates to determine if the user is starting to construct a modeling template. The suggestion engine 228 may utilize a pattern matching technique to make the determination. Initially, the model under construction may match many of the modeling templates. But, as further definition is provided, e.g., more blocks and connections are added, the suggestion engine 228 may determine that the model being constructed matches fewer of the modeling templates. When the model being constructed matches only a single modeling template, the suggestion engine 228 may retrieve that modeling template, and present it in, the model being constructed by the user. For example, the model being constructed may match a portion of the modeling template, and the suggestion engine 228 may present the remaining portion or portions of the modeling template in the model as an uncompleted portion or portions. The user may select the uncompleted portion or portions of the modeling template, and the suggestion engine 228 may convert the selected portion or portions of the modeling template into a completed portion or portions of the model being constructed. The user may select the portion or portions using a mouse click, a keyboard command, or another user interface command.

In some embodiments, the suggestion engine 228 may present a list of matching modeling templates when the model being constructed matches a plurality of modeling templates. For example, when part of the model being constructed matches a selected number of modeling templates, e.g., five, the suggestion engine 228 may present a list of the five matching modeling templates. The list may be presented on or near the model canvas on which the model is being constructed, and may identify the matching modeling templates by descriptive names. The user may select a desired modeling template from the list. In response, the suggest engine 228 may retrieve the selected modeling template, and place the selected modeling template or one or more portions thereof, such as the remaining portion or portions, in the model. The portion or portions of the selected modeling template may be presented in the model as completed. Alternatively, some or all of the modeling template may be presented as uncompleted elements.

The model editor 204 may present one or more of the model elements of the modeling template 2304 as completed model elements, while presenting one or more other model elements as uncompleted, as indicated at step 2706. The one or more completed model elements may be presented in the same form or format as other established elements of a model. On the other hand, the one or more uncompleted model elements may be presented using a different form and/or with a particular graphical affordance. In particular, the uncompleted model elements may be presented as ghost elements. For example, where completed or established blocks are presented on the canvas 2302 with a black outline, the completed blocks of the modeling template 2304 may similarly have a black outline. In addition, where established signal connections are illustrated as black arrows, completed signal connections of the template model 2304 may be shown as black arrows.

With reference to the modeling template 2304, the first and second sum blocks 2306 and 2308 are represented as completed, as are the first through seventh signal connections 2322-2328. The model editor 204 may present those elements of the template model for which there are no alternatives as completed. For those elements for which alternatives exist or are possible, the respective element may be presented in a manner that distinguishes them, e.g., visually, from the completed elements of the template model 2304. It should be understood that various graphical affordances, such as a different color, line style, fill color, fill pattern, shadow style, animation, etc., may be used to distinguish an uncompleted element, e.g., as a ghost element.

It some embodiments, elements of a modeling template may be presented in a ghost form where other options besides alternative elements are available for those elements, such as options or parameters.

In an embodiment, the model editor 204 may present uncompleted, e.g., ghost, elements, such as blocks or connections using a light blue or semi-transparent blue outline. The first and second integrator blocks 2310 and 2312, and the first and second gain blocks 2314 and 2316 are uncompleted or ghost blocks and thus may be shown in light blue outline. In addition to their distinguishing visual appearance, ghost blocks may also include an affordance for accepting the ghost block. Exemplary affordances for accepting a ghost block include selection and/or checkbox areas. For example, the first integrator ghost block 2310 may include a checkbox area 2330. If the user wishes to accept the first integrator ghost block 2310 of the template model 2304, he or she may select its associated accept affordance, e.g., using a mouse controlling a cursor on a display. In response to the selection of a ghost element, such as the first integrator ghost block 2310, through its accept affordance 2330, the model editor 204 may convert the selected ghost element into a completed or established model element, as indicated at step 2708.

Figure 24:
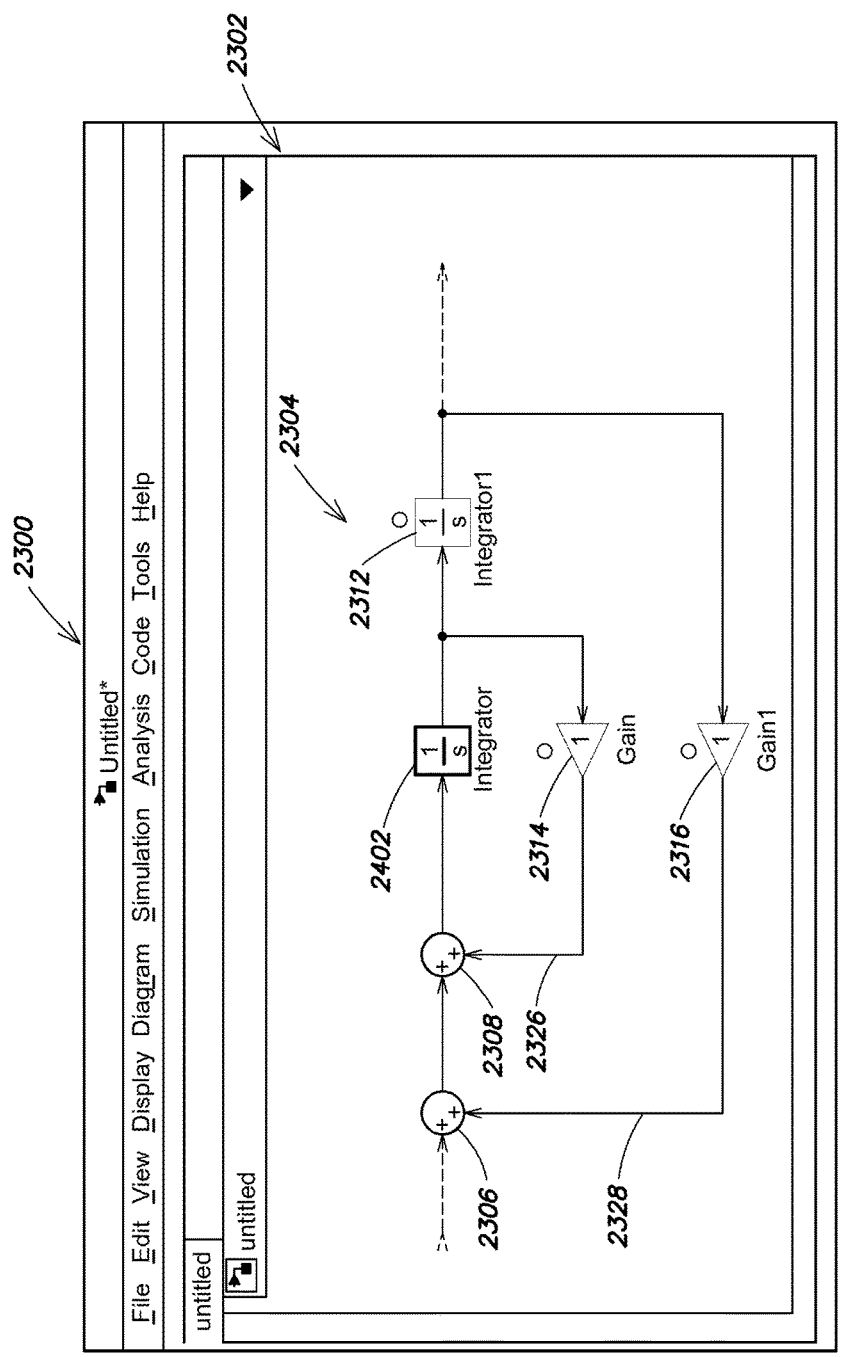
FIG. 24 is a schematic illustration of another example of a model editor window illustrating a template workflow in accordance with an embodiment.

FIG. 24 is a schematic illustration of the model editor window 2300 in which the ghost version 2310 of the first integrator block has been converted into a completed first integrator block 2402. To indicate the conversion visually, the completed first integrator block 2402 may be represented in the same manner as other completed or established model blocks, e.g., using a black outline.

In an embodiment, the model editor 204 also may present alternatives for one or more ghost elements of a modeling template, as indicated at step 2710. The presentation of alternatives may be provided in response to user input. For example, the alternatives may be presented in response to a mouse hover operation. Suppose for example, that one or more alternative blocks exist for the second integration block 2312 of the template model 2304. In response to a user input, for example a hover operation over the second integration block 2312, the model editor 204 may display the one or more alternatives on the canvas 2302 of the model editor window 2300.

Figure 25:
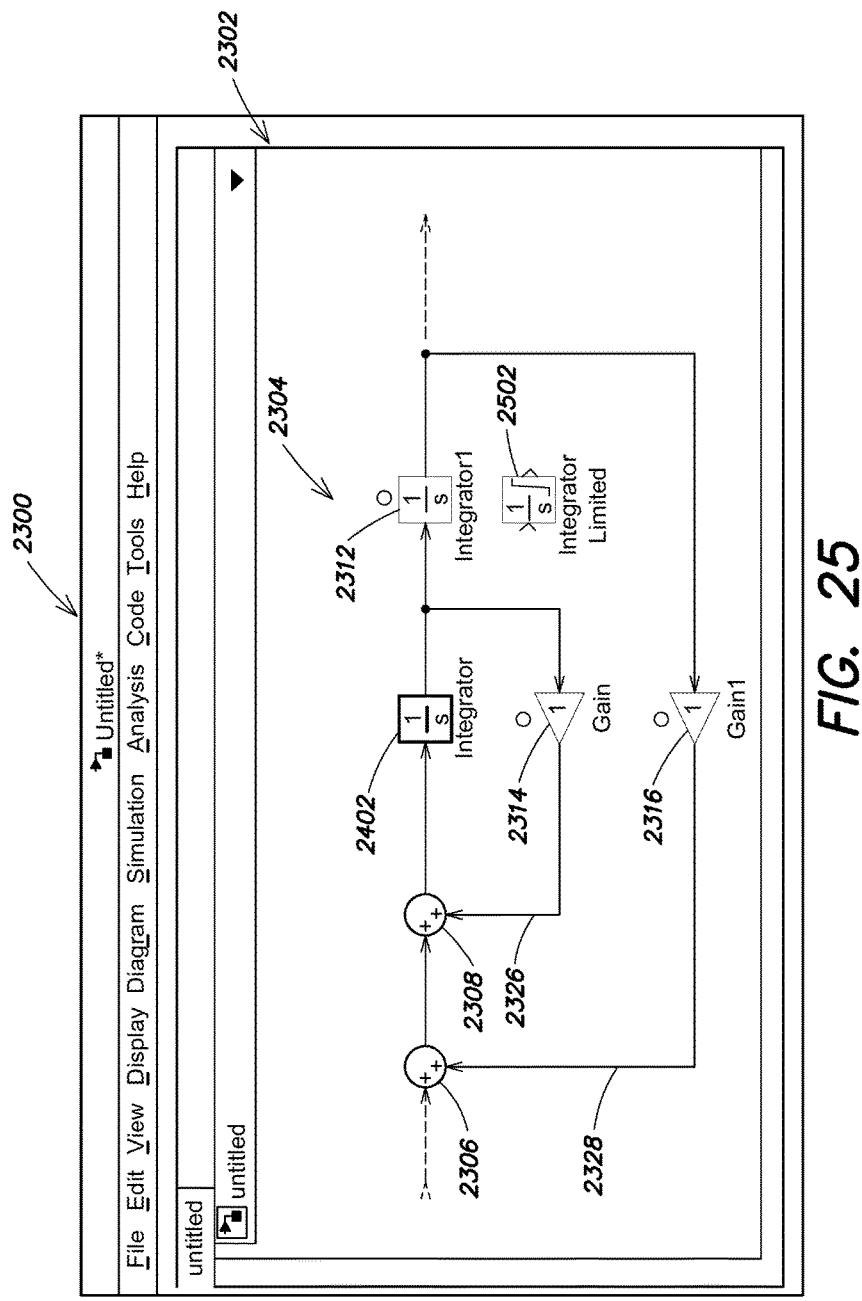
FIG. 25 is a schematic illustration of another example of a model editor window illustrating a template workflow in accordance with an embodiment.

FIG. 25 is a schematic illustration of the model editor window 2300 in which an alternative to the second integration block 2312 is presented. In particular, in response to the user input, e.g., the hover operation, the model editor 204 may access the template model store 232, and determine whether one or more alternatives exist for the model element identified by the user. If the modeling template store 232 includes information regarding alternatives, the model editor 204 may present information regarding the alternatives in the model editor window 2300, as indicated at step 2712. Information that may be used to identify alternative blocks includes same number of input and output ports, same data types for input and output ports, similar block names or descriptions, library category in which the blocks are stored, etc. To the extent the alternative is a different block, it may be presented on the canvas 2302. For example, suppose the modeling template store 232 indicates that an integrator limited block may be used instead of the second integrator block in the double integrator template model 2304. The Integrator Limited block may be designed to output the value of the integral of its input signal with respect to time, like the integrator block, with the exception that the output of the integrator limited block may be limited based on upper and lower saturation limits that may be specified for the block.

The model editor 204 may present this alternative, e.g., an integrator limited block 2502, to the user. In an embodiment, the model editor 204 may present the alternative in ghost form. In addition, the model editor 204 may maintain the display of the ghost version of the second integrator block 2312 so that the user may be presented with all of the alternatives, e.g., the second integrator block 2312 and the integrator limited block 2502. Should the user select the ghost version of the integrator limited block 2502, the model editor 204 may insert a completed version of the integrator limited block in the template model 2304, as indicated at step 2714.

Figure 26:
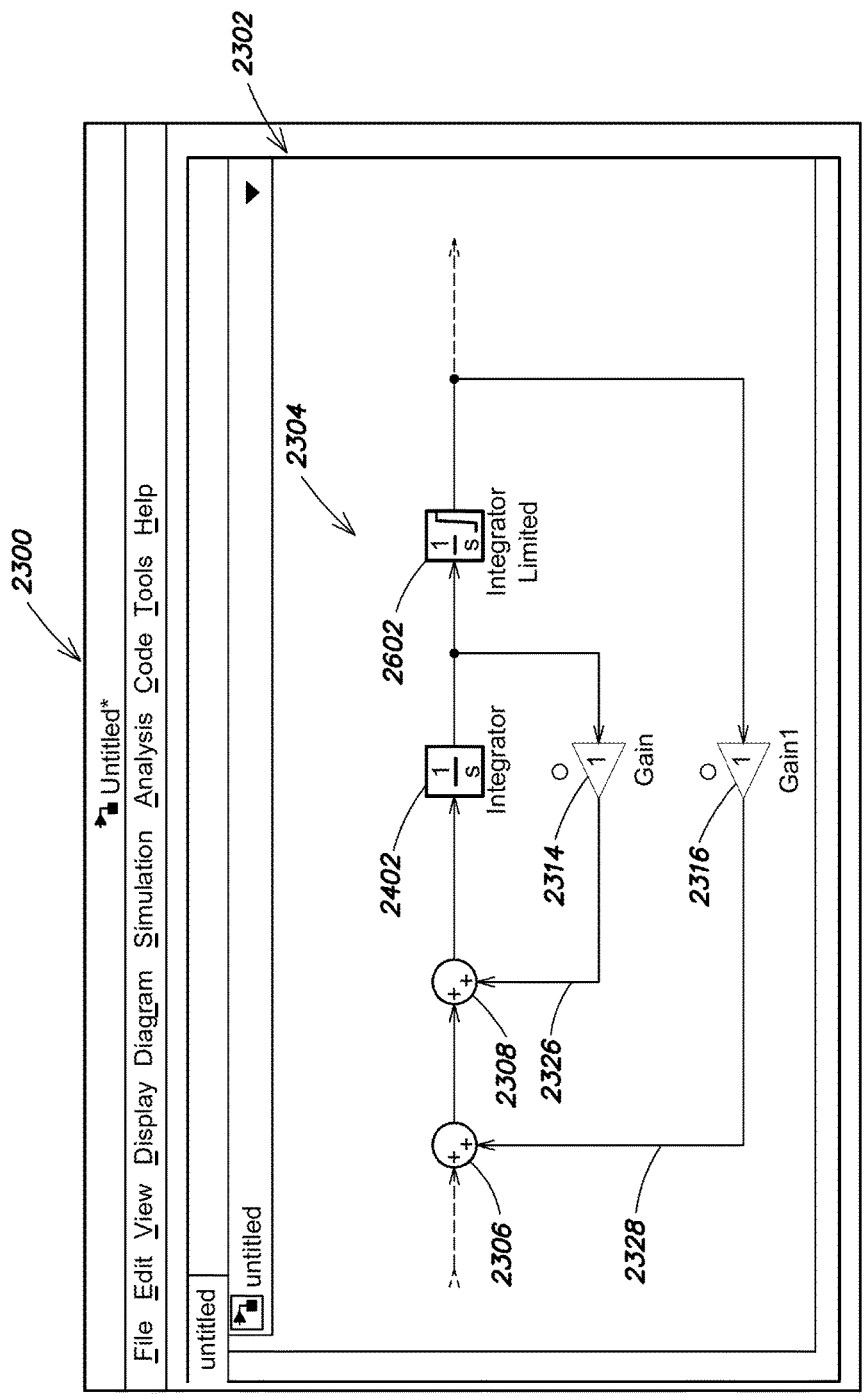
FIG. 26 is a schematic illustration of another example of a model editor window illustrating a template workflow in accordance with an embodiment.
Figure 27:
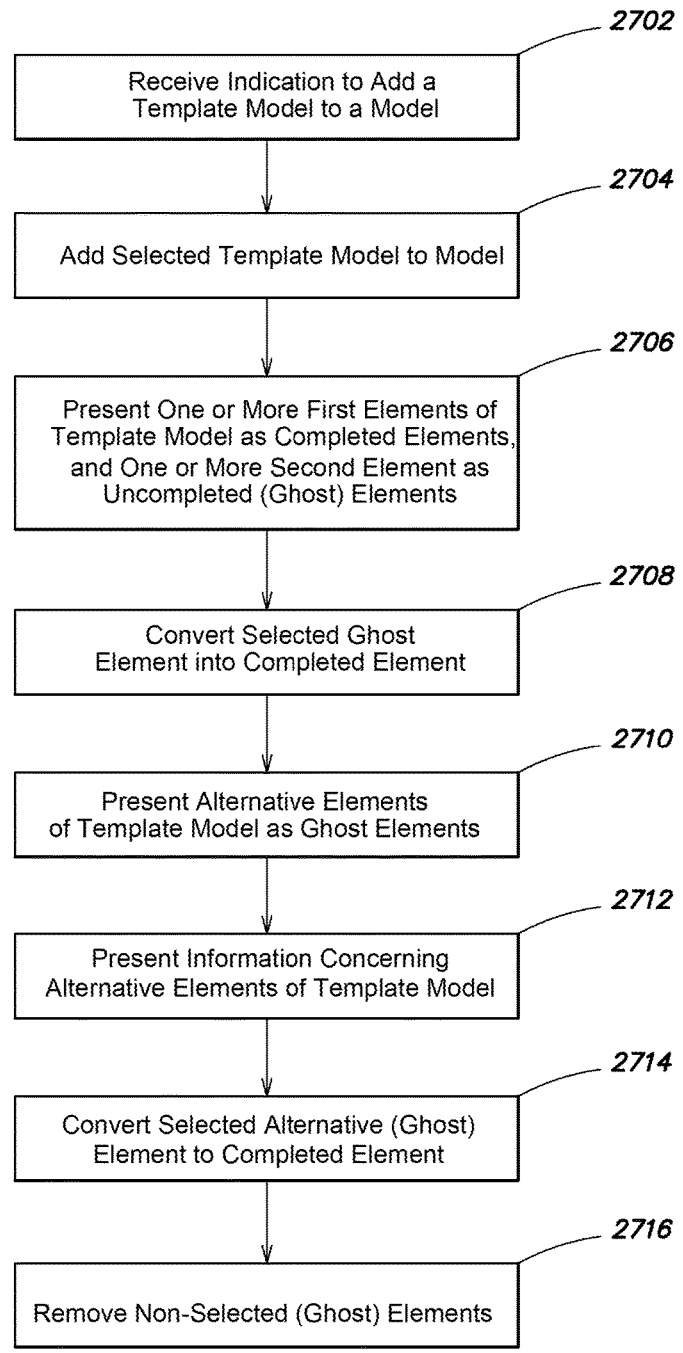
FIG. 27 is a flow diagram of an example of a method in accordance with an embodiment.

FIG. 26 is a schematic illustration of the model editor window 2300 following the selection of the ghost version of the integrator limited block 2502 (FIG. 25) as an alternative to the second integrator block 2312. The model editor 204 has included a completed integrator limited block 2602 in the template model 2304 in place of the previously presented ghost alternatives. The model editor 204 may remove any non-selected alternatives from the template model 2304, as indicated at step 2716.

To complete the modeling template 2304, the user may select the ghost versions of the first and second gain blocks 2314 and 2316. In response, the model editor 204 may convert the ghost versions of the gain blocks 2314 and 2316 into completed gain blocks. In addition, the user may add one or more other model elements to the canvas 2302, and may attach the hanging connections 2318 and 2320 to these newly added model elements, thereby completing those connections.

Contextual Information

In an embodiment, the suggestion engine 228 may present contextual information for one or more ghost elements of a model. For example, in response to user input, such as a mouse hover at a ghost element, the suggestion engine 228 may access contextual information for that element from the first storage unit 230, and may present that information. For example, the suggestion engine 228 may present the retrieved contextual information in a graphical affordance, such as a pop up window. The contextual information may include information regarding the operation of the respective ghost element. The contextual information may also include information regarding the effect that selecting, e.g., completing, the respective ghost component may have on the model.

Referring to FIG. 25, for example, contextual information may be presented for the second integrator block 2312 and for the integrator limited block 2502. The contextual information may include summary descriptions of integrator and integrator limited blocks. The contextual information may be presented in one or more graphical affordances, such as pop-up windows, dialogs, tooltips, etc.

FIG. 30 is a schematic illustration of a first pop-up window 3002 containing contextual information for the second integrator block 2312. FIG. 31 is a schematic illustration of a second pop-up window 3102 containing contextual information for the integrator limited block 2502. The pop-up windows 3002 and 3102 may be presented on the model editor window 2300 (FIG. 25).

Figure 28A:
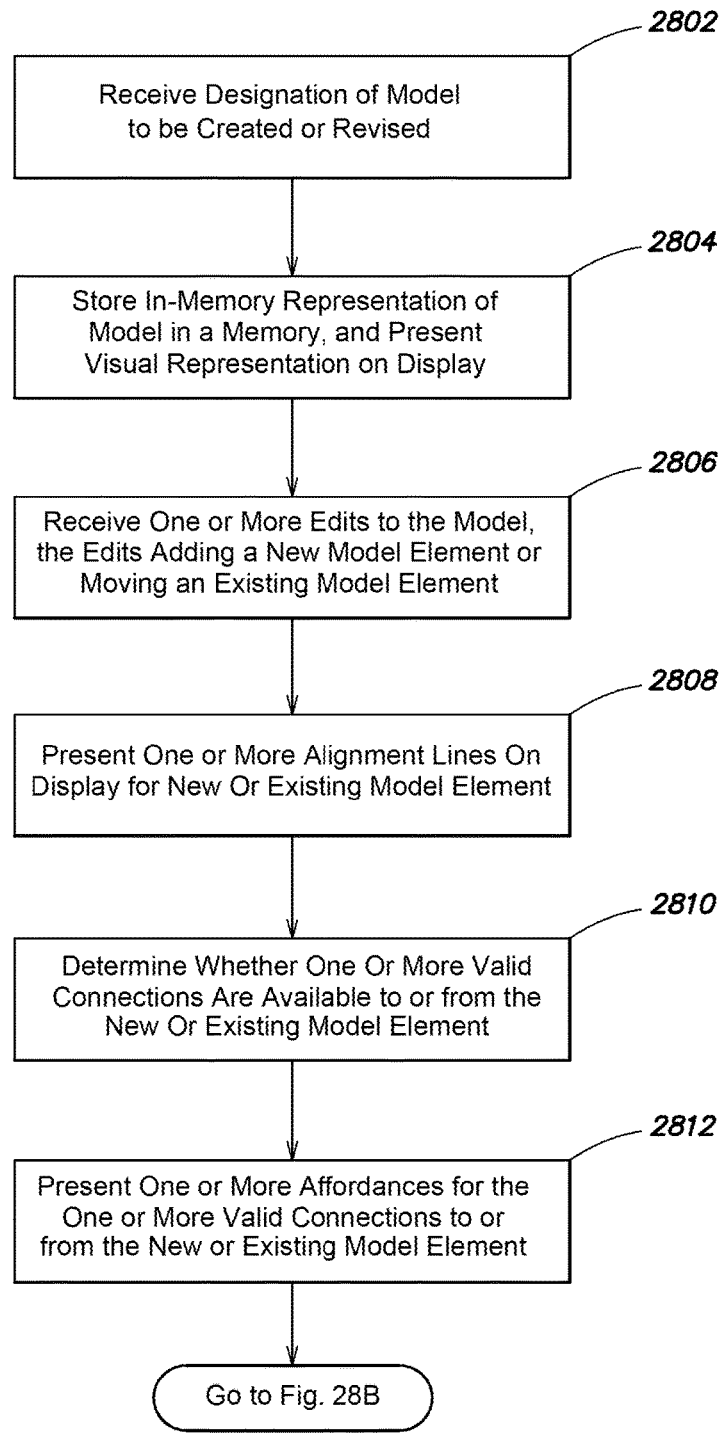
FIGS. 28A-C are flow diagrams of an example of a method in accordance with an embodiment.
Figure 28B:
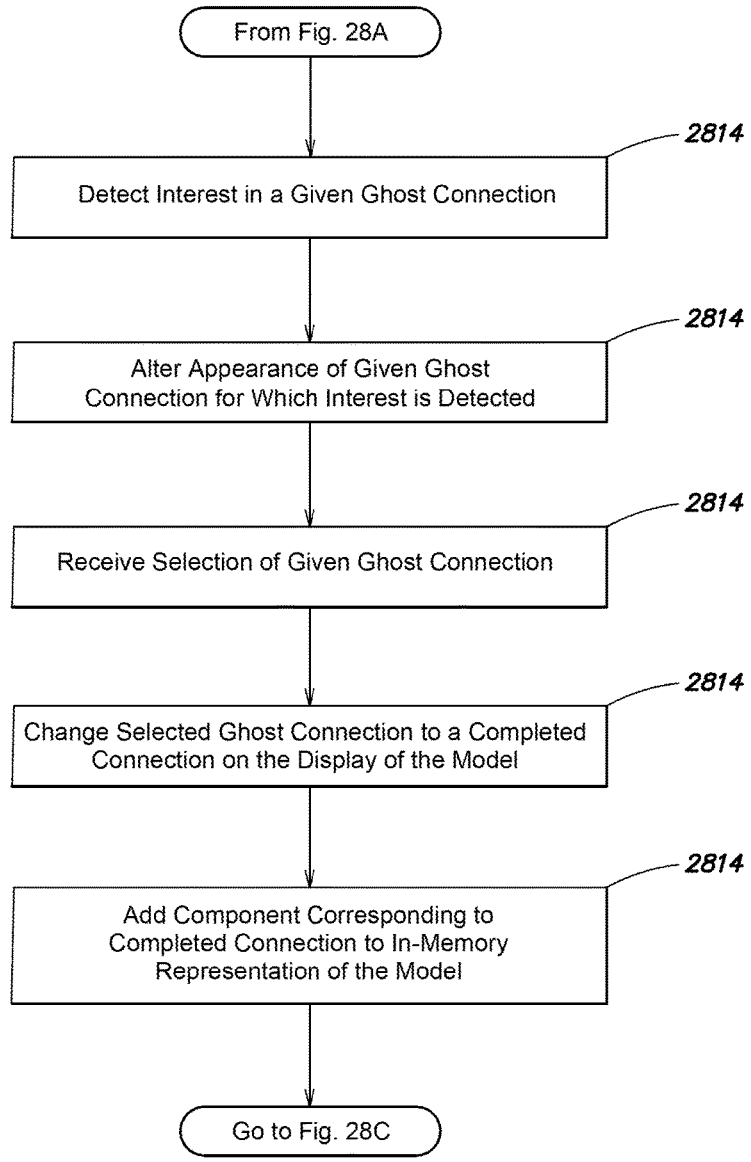
Figure 28C:
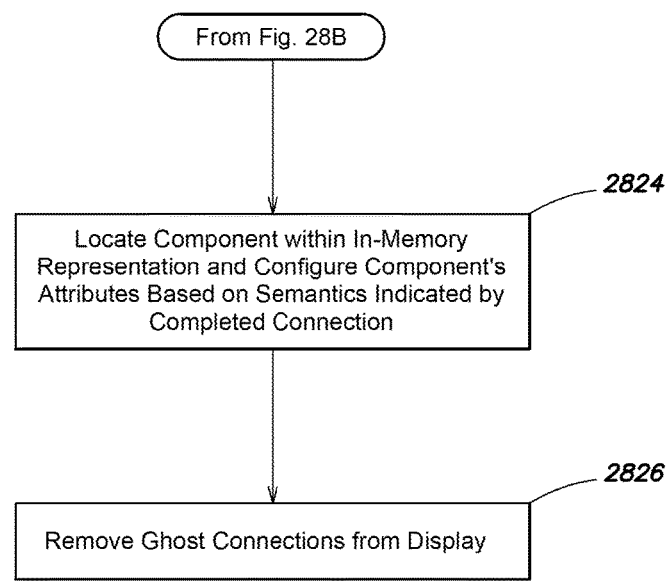

It should be understood that the popup windows 3002 and 3102 are intended for illustrative purposes only, and that other graphical affordances may be used, and that other information may be presented. FIGS. 28A-C are partial views of a flow diagram of a method in accordance with an embodiment. A model, such as the model 300, or a portion thereof may be opened within the modeling environment 200, as indicated at step 2802. An in-memory representation of the model 300 (or portion thereof) may be stored in memory, while a visual representation of the model 300 may be displayed, as indicated at step 2804. A user may modify the model 300, for example a user may add a new block to the model 300 or move an existing block, as indicated at step 2806. The model editor 204 may detect the movement, and may present markings, such as guide lines, when a first block reaches an in-line relationship on the canvas 302 with a second block, as indicated at step 2808. The prediction engine 226 may determine whether one or more valid connections can be made in response to the modification, as indicated at step 2810. The prediction engine 226 may convey the one or more possible valid connections to the suggestion engine 228, which may present one or more graphical affordances on the canvas for these possible valid connections to or from the new block, as indicated at step 2812. The one or more graphical affordances may be presented without the user having to select or identify both endpoints of the connection, for example without the user selecting both the source and destinations blocks and/or ports.

The suggestion engine 228 may detect user interest in a given ghost connection, as indicated at step 2814 (FIG. 28B). In response to detecting user interest in a given ghost connection, the suggestion engine 228 may alter the appearance of the given ghost connection, as indicated at step 2816. To the extent a particular ghost connection, as presented by the suggestion engine 228 represents a next step in the construction or editing of a model, as determined by the prediction engine 226, the user may select the particular ghost connection, and that selection may be received by the model editor 204, as indicated at step 2818. In response to receiving a selection of a particular ghost connection, the suggestion engine 228 may change the ghost connection into a completed model connection according to the syntax and/or semantics defined by the modeling environment 200, as indicated at step 2820. The suggestion engine 128 may cause a new component to be added to the in-memory representation of the model where the new component corresponds to the completed connection, as indicated at step 2822. In addition, the suggestion engine 228 may locate the new component of the in-memory representation and configure its attributes or parameters based on the completed connection 702 within the model 300, as indicated at step 2824 (FIG. 28C). Following the selection of a particular ghost connection and the conversion of that ghost connection to a completed connection, the suggestion engine may remove any other ghost connections that were temporarily displayed, as indicated at step 2826.

Illustrative Data Processing System

Figure 29:
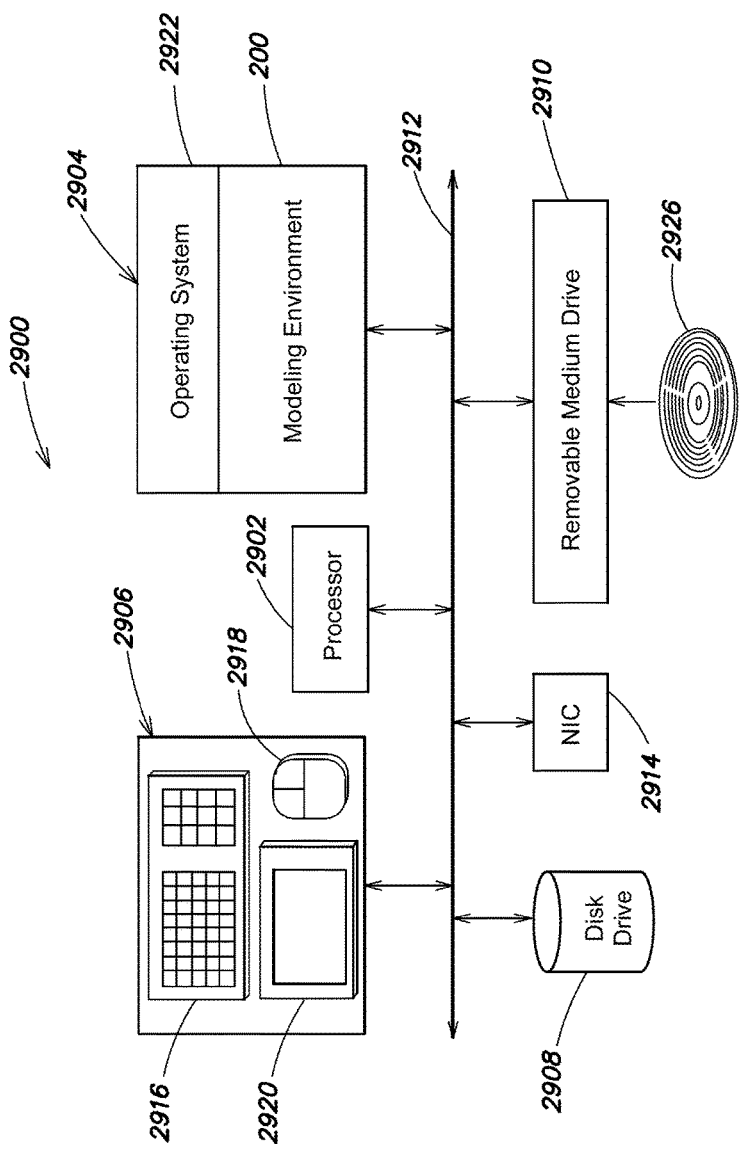
FIG. 29 is a schematic illustration of an example of a data processing system in accordance with an embodiment.

FIG. 29 is a schematic illustration of a computer or data processing system 2900 for implementing an embodiment of the disclosure. The computer system 2900 may include one or more processing elements, such as a processor 2902, a main memory 2904, user input/output (I/O) 2906, a persistent data storage unit, such as a disk drive 2908, and a removable medium drive 2910 that are interconnected by a system bus 2912. The computer system 2900 may also include a communication unit, such as a network interface card (NIC) 2914. The user I/O 2906 may include a keyboard 2916, a pointing device, such as a mouse 2918, and a display 2920. Other user I/O 2906 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 2904, which may be a Random Access Memory (RAM), may store a plurality of program libraries or modules, such as an operating system 2922, and one or more application programs that interface to the operating system 2922, such as the modeling environment 200.

The removable medium drive 2910 may accept and read a computer readable medium 2926, such as a CD, DVD, floppy disk, solid state drive, tape, flash memory or other non-transitory medium. The removable medium drive 2910 may also write to the computer readable medium 2926.

Suitable computer systems include personal computers (PCs), workstations, servers, laptops, tablets, palm computers, smart phones, electronic readers, and other portable computing devices, etc. Nonetheless, those skilled in the art will understand that the computer system 2900 of FIG. 29 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the modeling environment 200 may be hosted on one or more cloud servers or devices, and accessed by remote clients through a web portal or an application hosting system, such as the Remote Desktop Connection tool from Microsoft Corp.

Suitable operating systems 2922 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 2922 may provide services or functions for applications or modules, such as allocating memory, organizing data objects or files according to a file system, prioritizing requests, managing I/O, etc. The operating system 2922 may run on a virtual machine, which may be provided by the data processing system 2900.

As indicated above, a user, such as an engineer, scientist, programmer, developer, etc., may utilize one or more input devices, such as the keyboard 2916, the mouse 2918, and the display 2920 to operate the modeling environment 200, and construct one or more models. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 200) or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2900. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, the prediction and suggestion engine may be combined into a single module. Therefore, it is the object of the appended claims to cover all such variations and modifications as come within the true spirit and scope of the disclosure.

What is claimed is:

1. A method comprising:
presenting, on a display, a graphical model including:
   a first element,
   a second element,
   executable semantics, and
   a completed connection display format;
automatically identifying, by a processor, a possible connection between the first element and the second element of the graphical model, the possible connection being a valid connection according to the executable semantics of the graphical model;
presenting, on the display, a graphical affordance representing the possible connection between the first element and the second element of the graphical model, where the graphical affordance differs in appearance from the completed connection display format;
following the presenting the graphical affordance, receiving a user selection of the graphical affordance;
in response to the receiving the user selection of the graphical affordance,
   changing, visually on the display, the graphical affordance to the completed connection display format representing a completed connection on the graphical model, or
   replacing, visually on the display, the graphical affordance with the completed connection display format representing the completed connection on the graphical model; and
updating, by the processor, an in-memory representation of the graphical model to include a portion for the valid connection.

2. The method of claim 1 wherein the graphical affordance is a ghost version of the completed connection display format.

3. The method of claim 1 wherein the first element is configured to generate an output having first attributes, and the second element is configured to receive an input having second attributes, the method further comprising:
determining that the first attributes match the second attributes, wherein
the presenting the graphical affordance is in response to the determining.

4. The method of claim 3 wherein the first attributes include one or more of:
a data dimension,
a data type,
a data complexity,
a sample time, or
a modeling domain.

5. The method of claim 1 wherein:
the first element is a first state element of the graphical model,
the second element is a second state element of the graphical model, and
the possible connection represents a state transition between the first state element and the second state element.

6. The method of claim 1 wherein:
the first element is a first dynamic system,
the second element is a second dynamic system, and
the possible connection represents a time-varying mathematical relationship between the first dynamic system and the second dynamic system.

7. The method of claim 1 wherein:
the first element is newly added to the graphical model, and
the second element is a pre-existing element of the graphical model.

8. The method of claim 1 further comprising:
detecting a geometric relationship between the first element and the second element as presented on the display, wherein the presenting the graphical affordance is in response to the detecting the geometric relationship.

9. The method of claim 8 wherein the geometric relationship is at least one of:
a distance between the first element and the second element,
a proximity between the first element and the second element,
a movement of the first element toward the second element, or
an in-line relationship between the first element and the second element.

10. The method of claim 1 further comprising:
detecting a geometric relationship between a cursor and the first element or the second element, wherein the presenting the graphical affordance is in response to the detecting the geometric relationship.

11. The method of claim 1 further comprising:
generating topological information for the graphical model,
where the possible connection is automatically identified based on the topological information for the graphical model.

12. The method of claim 1 further comprising:
performing a model editing operation to the graphical model,
where the possible connection is automatically identified in response to the model editing operation.

13. A method comprising:
presenting, on a display, a graphical model including:
   a first element, a second element, and
executable semantics;
automatically identifying, by a processor, a possible connection between the first element and the second element of the graphical model, the possible connection being a valid connection according to the executable semantics of the graphical model;
presenting, on the display, a graphical affordance representing a new port at the second element;
following the presenting the graphical affordance, receiving a user indication of the new port at the second element;
in response to the receiving the user indication of the new port at the second element, presenting, on the display, a completed connection between the first element and the new port at the second element; and
updating, by the processor, an in-memory representation of the graphical model to include one or more portions for the completed connection and the new port.

14. The method of claim 13 wherein the graphical model further includes a completed port display format, the method further comprising:
changing the graphical affordance to the completed port display format at the second element, the graphical affordance:
differing in appearance from the completed port display format.

15. The method of claim 14 wherein the graphical affordance is a ghost version of the completed port display format.

16. An apparatus comprising:
a display presenting a graphical model including:
a first element,
a second element,
executable semantics, and
a completed connection display format;
a processor configured to:
identify a possible connection between the first element and the second element of the graphical model, the possible connection being a valid connection according to the executable semantics of the graphical model;
present, on the display, a graphical affordance representing the possible connection between the first element and the second element of the graphical model, where the graphical affordance differs in appearance from the completed connection display format;
following the present the graphical affordance on the display, receive a user selection of the graphical affordance;
in response to the receive the user selection of the graphical affordance,
change, visually on the display, the graphical affordance to the completed connection display format representing a completed connection on the graphical model, or
replace, visually on the display, the graphical affordance with the completed connection display format representing the completed connection on the graphical model; and
update an in-memory representation of the graphical model to include a portion for the valid connection.

17. The apparatus of claim 16 wherein the graphical affordance is a ghost version of the completed connection display format.

18. The apparatus of claim 16 wherein the first element is configured to generate an output having first attributes, and the second element is configured to receive an input having second attributes, the processor further configured to:
determine that the first attributes match the second attributes, wherein
the presenting the graphical affordance is in response to the determining.

19. The apparatus of claim 18 wherein the first attributes include one or more of:
a data dimension,
a data type,
a data complexity,
a sample time, or
a modeling domain.

20. The apparatus of claim 16 wherein the processor is further configured to:
detect a geometric relationship between the first element and the second element as presented on the display, wherein the graphical affordance is presented in response to the detect the geometric relationship.

21. A non-transitory computer-readable medium containing instructions executable by a processor, the instructions comprising instructions for:
presenting, on a display, a graphical model including:
a first element,
a second element,
executable semantics, and
a completed connection display format;
automatically identifying, by a processor, a possible connection between the first element and the second element of the graphical model, the possible connection being a valid connection according to the executable semantics of the graphical model;
presenting, on the display, a graphical affordance representing the possible connection between the first element and the second element of the graphical model, where the graphical affordance differs in appearance from the completed connection display format;
following the presenting the graphical affordance, receiving a user selection of the graphical affordance;
in response to the receiving the user selection of the graphical affordance,
changing, visually on the display, the graphical affordance to the completed connection display format representing a completed connection on the graphical model, or
replacing, visually on the display, the graphical affordance with the completed connection display format representing the completed connection on the graphical model; and
updating, by the processor, an in-memory representation of the graphical model to include a portion for the valid connection.

22. The non-transitory computer-readable medium of claim 21 wherein:
the first element is a first state element of the graphical model,
the second element is a second state element of the graphical model, and
the possible connection represents a state transition between the first state element and the second state element.

23. The non-transitory computer-readable medium of claim 21 wherein:
the first element is a first dynamic system,
the second element is a second dynamic system, and the possible connection represents a time-varying mathematical relationship between the first dynamic system and the second dynamic system.

* * * * *